US006058318A

United States Patent [19]

Kobayakawa et al.

[11] Patent Number: 6,058,318

[45] Date of Patent: May 2, 2000

[54] RADIO BASE STATION IN CELLULAR MOBILE COMMUNICATION SYSTEM

[75] Inventors: Shuji Kobayakawa; Yoshinori Tanaka; Hiroyuki Seki; Takeshi Toda; Masafumi Tsutsui, all of Kawasaki, Japan

[73] Assignee: Fujitsu Limited, Kanagawa, Japan

[21] Appl. No.: 09/021,357

[22] Filed: Feb. 10, 1998

[30] Foreign Application Priority Data

Jun. 12, 1997 [JP] Japan .................................... 9-155022

[51] Int. Cl.[7] ....................................................... H04B 1/38

[52] U.S. Cl. .......................... 455/562; 375/226; 375/340; 375/349

[58] Field of Search ............................... 455/60, 63, 67.6, 455/500, 501, 504, 506, 526, 561, 562; 375/226, 330, 254, 278, 283, 284, 329, 331, 340, 375; 343/702, 721; 371/37.7, 611

[56] References Cited

U.S. PATENT DOCUMENTS

| | | | |
|---|---|---|---|
| 4,328,499 | 5/1982 | Anderson et al. | 343/113 R |
| 5,592,180 | 1/1997 | Yokev et al. | 342/450 |
| 5,893,033 | 4/1999 | Keskitalo et al. | 455/562 |
| 5,905,949 | 5/1999 | Hawkes | 455/410 |
| 5,960,349 | 9/1999 | Chheda et al. | 455/446 |

FOREIGN PATENT DOCUMENTS

| | | |
|---|---|---|
| 0110260 | 6/1984 | European Pat. Off. . |
| 2318216 | 4/1998 | United Kingdom . |

*Primary Examiner*—Edward F. Urban
*Assistant Examiner*—Congvan Tran
*Attorney, Agent, or Firm*—Helfgott & Karas, P C.

[57] ABSTRACT

A reference antenna element out of plural antenna elements directed to the same sector is set as a first antenna element; a receiver for frequency conversion of the signal received by the first antenna element is set as a first receiver; any antenna element different from the first antenna element is set as a second antenna element; and a receiver for frequency conversion of the signal received by the second antenna element is set as a second receiver. The output signals of the first and second receivers relative to a specific up-signal are supplied to phase compensation calculator means, which then calculates the phase compensation amount representing the phase amount of the difference between the output-signal phase difference of the first and second receivers and the input-signal phase difference of the first and second receivers.

22 Claims, 20 Drawing Sheets

$\alpha = \tan^{-1}(\sqrt{2}\,H/R)$ $\beta = \tan^{-1}(H/R)$

RADIO BASE STATION IN CELLULAR MOBILE COMMUNICATION SYSTEM

BACKGROUND OF THE INVENTION

1. Field of the Invention

The present invention relates to a radio base station in a cellular mobile communication system (hereinafter referred to simply as a radio base station), and more particularly to phase compensation for correcting a phase deviation caused in frequency conversion of signals received by antenna elements directed to each sector.

2. Description of the Related Art

Various mobile communication services including car/portable telephone service have been remarkably developed in the recent several years not only in Japan but also throughout the world. And in such mobile communication technology, amazing development is observed especially with regard to cellular car/portable telephone service.

A cellular mobile communication system covers its entire service area by a multiplicity of cells which correspond to service zones of individual radio base stations. In this system, there occurs little interference to any other than the relevant cell to which antenna elements are directed, and in order to eliminate any interference wave arriving from other mobile stations beyond the directions of antenna elements, each cell is divided into a plurality, e.g., six, of sectors, and a signal from any mobile station positioned in each sector is received by a plurality of antenna elements directed to the relevant sector.

The signal received by a plurality of antenna elements directed to each sector is low-noise amplified by an LNA (Low Noise Amplifier), and digital orthogonal I, Q signals of baseband are generated in a heterodyne receiver including an AGC circuit (hereinafter a circuit composed of nonlinear elements converting of the received signal into baseband signals will be referred to as a receiver). Subsequently the signals are processed in a beam former to be given an amplitude weight and a phase rotation, and then the signals are synthesized to be thereby formed into a desired sharp beam pattern to enhance the gain.

In this manner, if a multi-beam antenna or adaptive array antenna with digital signal processing is applied to a radio base station in a cellular mobile communication system, it becomes possible to attain enhancement of the gain by sharpening the beam pattern equivalently and also to increase relatively easily the number of users accommodatable in a single cell by the action of reducing the intra-area interference.

However, relative to adoption for a radio base station in a cellular mobile system, the known beam forming technique with the conventional digital signal processing is still in a stage of research, and in most cases the study is carried out with computer simulations on the supposition of an ideal environment (where no phase deviation is existent between the receiver outputs (hereinafter referred to as antenna branches) derived from the input signal to antenna elements).

In the case of employing a multi-beam antenna, beam forming from the outputs of a plurality of antenna branches is executed on the supposition that there is no phase deviation between the antenna branches, so that when any phase deviation is existent between the antenna branches due to manufacture errors, secular changes, temperature characteristics and so forth in nonlinear elements such as LNAs, and mixers, a desired beam pattern fails to be attained to consequently bring about deterioration of the characteristics.

Meanwhile in the case of employing an adaptive array antenna, it may be considered that beam forming is executed without such problem despite any phase deviation between the antenna branches, since the amplitude and the phase are controlled inclusive of the phase deviation. In a transmission mode where beam forming is executed on the basis of controlled variables in reception in adaptive processing, separation of such controlled variables of the amplitude and the phase from the phase deviation is a requisite condition. However, it has been impossible in the prior art heretofore to realize such separation of the controlled variables.

SUMMARY OF THE INVENTION

It is therefore an object of the invention to provide a radio base station in a cellular mobile communication system wherein efficient beam forming is achieved through compensation of any phase deviation derived from nonlinear elements or the like of receivers, by the use of a specific user signal within a sector, in a stage anterior to the digital area beam forming.

In accordance with an aspect of the present invention, there is provided a radio base station in a cellular mobile communication system comprising: a plurality of antenna elements having directivity to respective divided sectors of a cell which is a range predetermined for transmission and reception of signals between the base station and each of mobile stations; a plurality of receivers provided correspondingly to said antenna elements for extracting a desired frequency component from a signal received by said antenna elements directed to a same sector and then frequency-converting the extracted component to a predetermined band; a beam former for forming a desired beam pattern on the basis of the output signals of said receivers directed to each sector, wherein one reference antenna element out of the plurality of antenna elements directed to the same sector is set as a first antenna element, one receiver for frequency-converting the signal received by said first antenna element is set as a first receiver, any antenna element different from said first antenna element is set as a second antenna element, and the receiver for frequency-converting the signal received by said second antenna element is set as a second receiver; phase compensation calculating means for calculating, in response to the outputs of the first and second receivers relative to a specific up-signal, a required phase compensation amount which represents the difference phase amount between the output-signal phase difference of said first and second receivers and the input-signal phase difference of said first and second receivers; and phase compensating means for correcting the phase of the output signal of said second receiver on the basis of the phase compensation amount.

In accordance with another aspect of the present invention, there is provided a radio base station in a cellular mobile communication system comprising: a plurality of antenna elements having directivity to respective divided sectors of a cell which is a range predetermined for transmission and reception of signals between the base station and each of mobile stations; a plurality of receivers provided correspondingly to said antenna elements for extracting a desired frequency component from a signal received by said antenna elements directed to a same sector and then frequency-converting the extracted component to a predetermined band; a beam former for forming a desired beam pattern on the basis of the output signals of said receivers directed to each sector, wherein one reference antenna element out of the plurality of antenna elements directed to the same sector is set as a first antenna element, one receiver for frequency-converting the signal received by said first antenna element is set as a first receiver, any antenna element different from said first antenna element is set as a second antenna element, and the receiver for frequency-converting the signal received by said second antenna element is set as a second receiver; phase compensating means for correcting the phase of the output signal of said second receiver on the basis of a first phase compensation amount; phase compensation calculating means for calculating a second phase compensation amount which represents the difference phase amount between the output-signal phase difference of said first receiver and said phase compensating means and the input-signal phase difference of said first and second receivers; and adding means for adding the output signal thereof to said second phase compensation amount, and outputting said first phase compensation amount to said phase compensating means.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
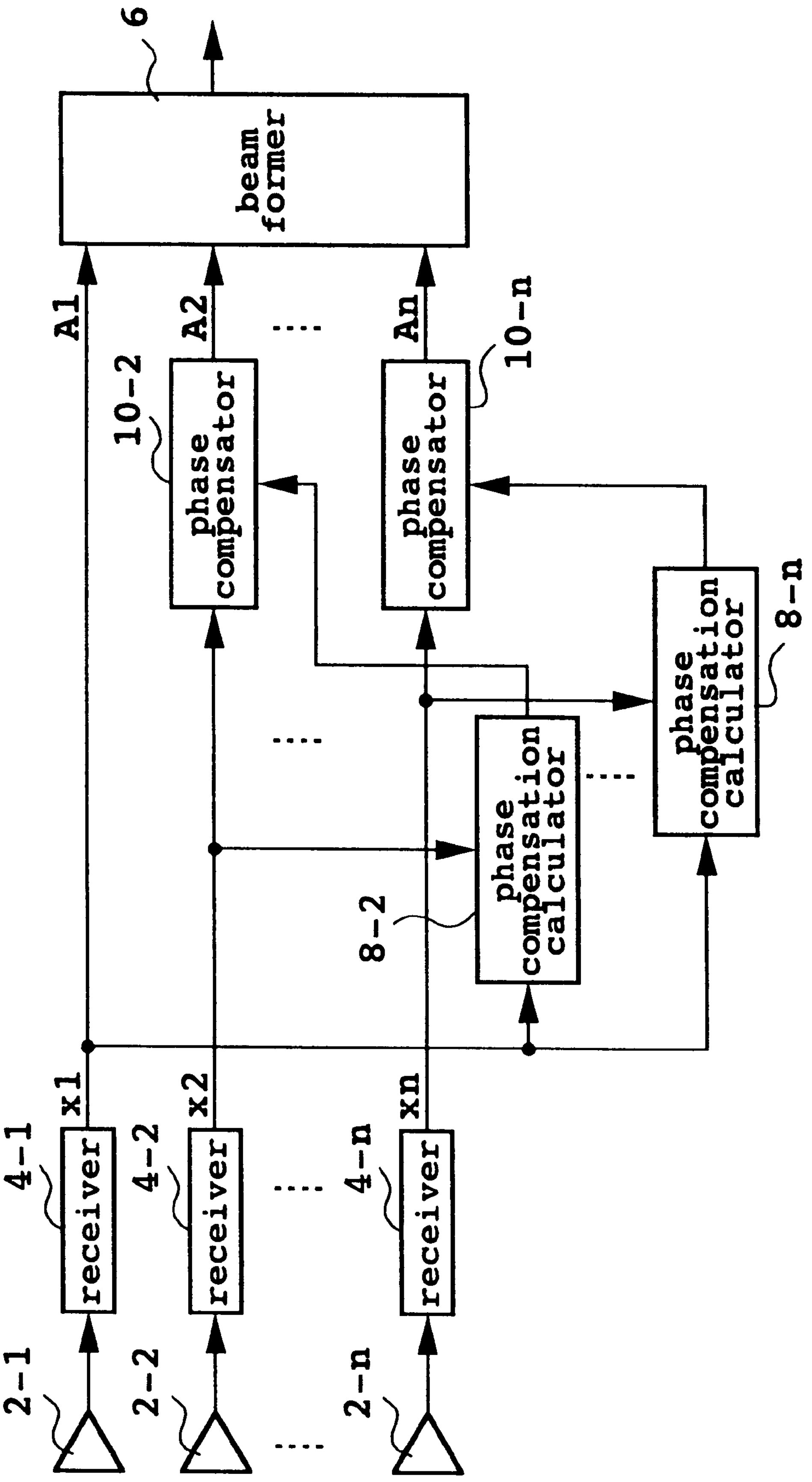
FIG. 1 is a first principle diagram for explaining the present invention.
Figure 2:
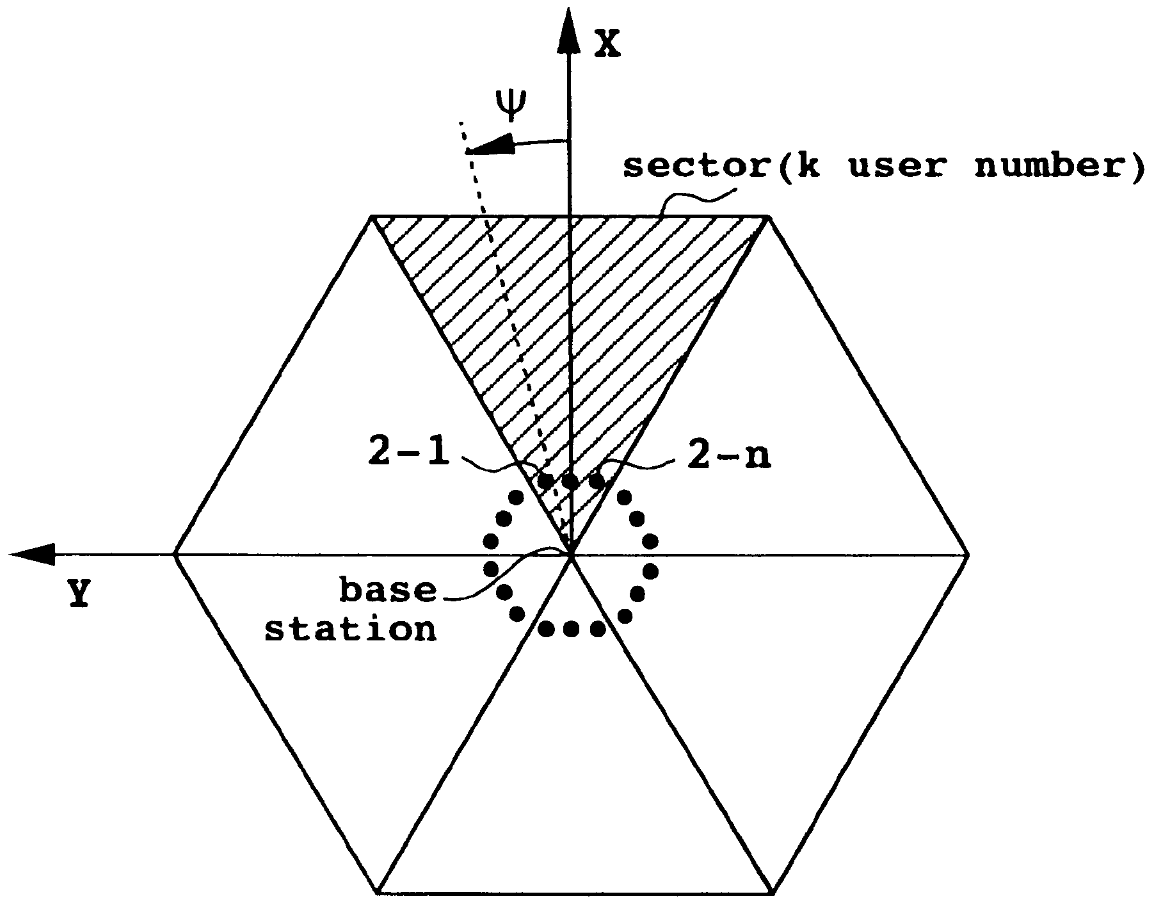
FIG. 2 is a diagram showing a sector.

FIG. 1 is a first principle diagram for explaining the present invention, and FIG. 2 is a diagram showing sectors. In FIG. 2, a radio base station is located at a center and controls mobile stations positioned within a cell of a fixed range. The cell is divided into a plurality (e.g., six) of sectors, and there are arranged antenna elements 2-*k* (k=1~n) directed to each sector.

Since any of the sectors is structurally the same, a description will be given on one sector denoted by oblique lines in FIG. 2. A plurality of antenna elements 2-*k* (k=1~n) each having directivity to the sector are arranged in the sector in parallel to the Y-axis.

The present invention comprises receivers 4-*k* provided correspondingly to the antenna elements 2-*k* and each extracting a desired frequency component from a signal received by the antenna elements 2-*k* directed to the same sector and then converting the extracted frequency component to a predetermined band; a beam former 6 for forming a desired beam pattern on the basis of the output signals of the plural receivers 4-*k;* phase compensation calculator means 8-*j* (j=2~n) for calculating the amounts of phase compensation; and phase compensator means 10-*j* (j=2~n). In the above, a reference antenna element out of the plural antenna elements 2-*k* directed to the same sector is set as a first antenna element 2-1; a receiver for frequency conversion of the signal received by the first antenna element 2-1 is set as a first receiver 4-1; an antenna element 2-*j* (j=2~n) different from the first antenna element is set as a second antenna element 2-*j;* and a receiver 4-*j* for frequency conversion of the signal received by the second antenna element 2-*j* is set as a second receiver 4-*j.* The output signals of the first and second receivers 4-1, 4-*j* relative to a specific up-signal are supplied to the phase compensation calculator means 8-*j*, which then calculates the phase compensation amount representing the phase amount of the difference between the output-signal phase difference of the first and second receivers 4-1, 4-*j* and the input-signal phase difference of the first and second receivers 4-1, 4-*j.* And the phase compensator means 10-*j* executes phase correction on the basis of the phase compensation amount for the output signal of the second receiver 4-*j.*

Due to the above-described configuration of the present invention, user signals Xk (k=1~n) of the receivers 4-*k* (k=1~n) can be represented by complex numbers as expressed in Eq. (1), where m denotes the number of users in the area of this sector, and n for the number of antenna elements 2-*k* (k=1~n) directed to the relevant sector.

$$X1=\exp[(-1)^{1/2}(\alpha_i(t)+\phi_1)]$$

$$X2=\exp[(-1)^{1/2}(\alpha_i(t)+\Delta\theta_{i2}+\phi_2)]$$

$$\vdots$$

$$Xn=\exp[(-1)^{1/2}(\alpha_i(t)+\Delta\theta_{in}+\phi_n)] \quad (1)$$

where $\alpha_i(t)$: Phase of i (i=1~k)th user signal in each receiving path $\Delta\theta_{ij}$: Phase rotation of Xj determined with reference to X1 by arrangement of antenna element 2-*k* and angle of incoming wave from ith user $\phi_j$: Phase including phase deviation of receiver 4-*j*

$(-1)^{1/2}$: Imaginary unit

The following calculation is executed by the use of the above signals.

$$Yj=Xj\cdot X^*1=\exp[(-1)^{1/2}(\phi_j-\phi_1+\Delta\theta_{ij})] \quad (2)$$

In Eq. (2), * denotes a complex conjugate.

The phase compensation calculator means 8-*j* calculates a required amount of phase compensation $\Delta\phi=(\phi_j-\phi_1)$ from the output signals X1, Xj of the first and second receivers 4-1, 4-*j*.

The phase compensator means 10-*j* executes phase compensation of Eq. (3) for the output signal Xj of the second receiver 4-*j*.

$$Aj=Xj\cdot\exp(-(-1)^{1/2}\Delta\phi)=\exp[(-1)^{1/2}(\alpha_i(t)+\phi_1+\Delta\theta_{ij})] \quad (3)$$

while, $$X1=A1=\exp[(-1)^{1/2}(\alpha_i(t)+\phi_1)] \quad (4)$$

Therefore, the phase term of the output signal Aj of the phase compensator means 10-*j* is rendered equal to the receiving path of the reference antenna element 2-1 with the exception of the phase rotation term $\Delta\theta_{ij}$ determined by the antenna arrangement and the incoming wave angle from the user, whereby a phase compensation is executed.

The beam former 6 forms a desired beam pattern on the basis of the phase-compensated signal. Since the signal inputted to the beam former 6 is phase-compensated by the phase compensator means 10-*j*, the efficiency of forming the beam pattern is enhanced in the case of a multi-beam antenna.

The phase compensation calculator means 8-*k* may comprise a control means and an averaging means. The control means produces a control signal to signify that the outputs of the first and second receivers 4-1, 4-*j* are based on an up-signal which, out of up-signals from the mobile stations positioned in the sector to which the first and second antenna elements 2-1, 2-*j* are directed, belongs to a population where the phase-rotation average value indicative of the phase difference between the output signal of the first antenna element 2-1 and that of the second antenna element 2-*j* is a known value. And the averaging means calculates, in response to the control signal, a required phase compensation amount which corresponds to the difference between the known value and the average value of the phase difference between the output signal of the first receiver 4-1 and that of the second receiver 4-*j*.

As given in Eq. (2), the phase difference between the output signal X1 of the first receiver 4-1 and the output signal Xj of the second receiver 4-*j* is $(\phi_j-\phi_1+\Delta\theta_{ij})$. The control means controls the averaging means in such a manner as to use the up-signal belonging to a population where the average value of $\Delta\theta_{ij}$ becomes the known value $\Delta\Theta_j$.

The averaging means calculates the average value Bj of the phase difference between X1 and Xj, as given in Eq. (5) below.

$$Bj=(1/m)\sum_{i=1}^{m}(\phi_j-\phi_1+\Delta\theta_{ij}) \quad (5)$$

The average value Bj of Eq. (5) is presumed to be equal to $(\phi_j-\phi_1+\Delta\Theta_j)$. And the amount of phase compensation obtained as a result of subtracting $\Delta\Theta_j$ from Bj is $(\phi_j-\phi_1)$. The phase compensator means 10-*j* executes a phase correction by subtracting $(\phi_j-\phi_1)$ from the phase $(\alpha_i(t)+\Delta\theta_{ij}+\phi_j)$ of Xj, so that the output of the phase compensator means 10-*j* is corrected as given in Eq. (3) to thereby achieve the phase compensation.

Figure 3:
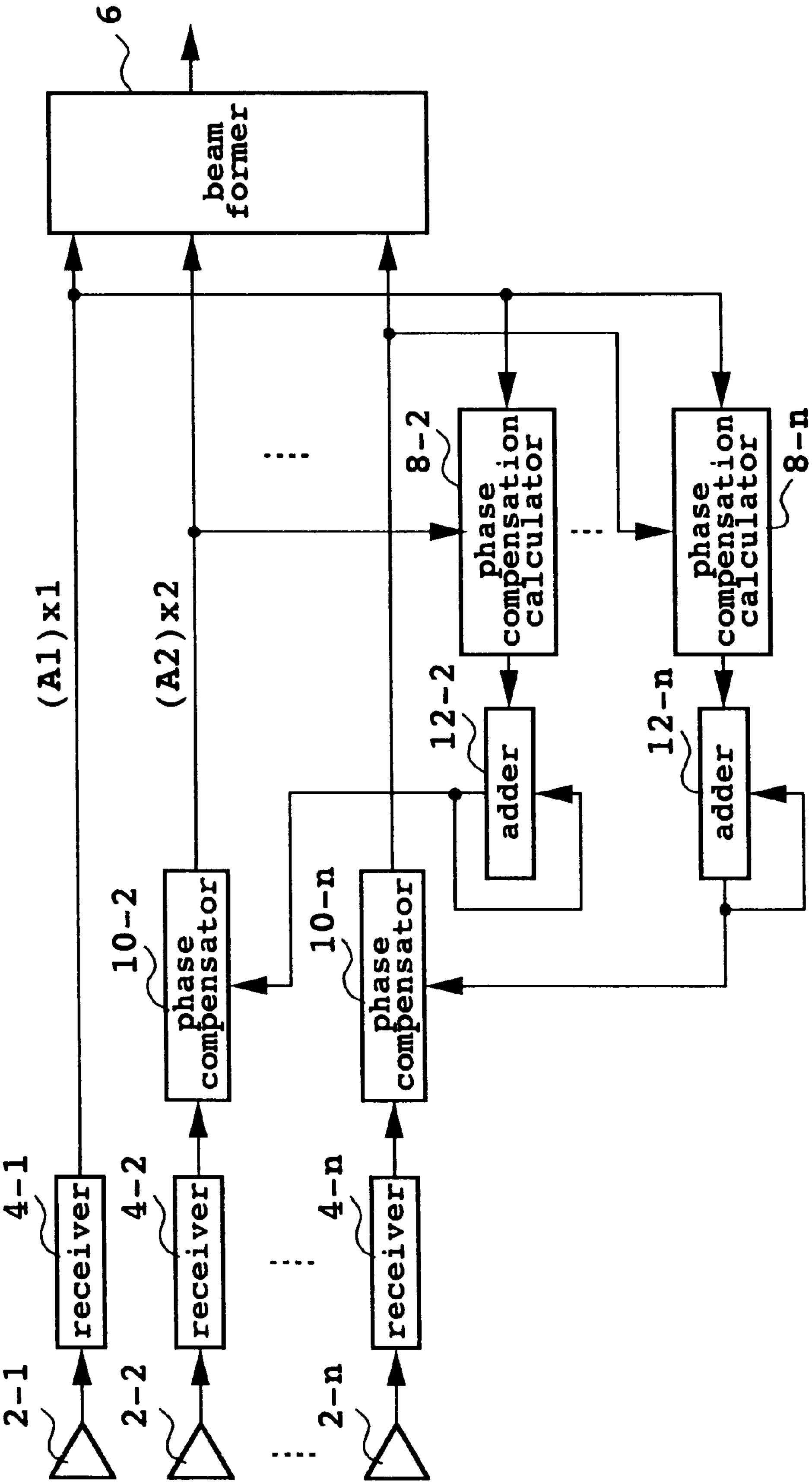
FIG. 3 is a second principle diagram for explaining the invention.

FIG. 3 is a second principle diagram for explaining the present invention. As shown in FIG. 3, the present invention may comprise phase compensator means 12-*j* which inputs a first phase compensation amount and executes a phase compensation for the output signal of a second receiver 4-*j* on the basis of the first phase compensation amount; phase compensation calculator means 8-*j* which inputs the output signal of a first receiver 4-1 and the output signal of phase compensator means 10-*j*, and then calculates a second phase compensation amount indicative of the phase amount corresponding to the difference between the output-signal phase difference of the first receiver 4-1 and the phase compensator means 10-*j*, and the input-signal phase difference of the first and second receivers 4-1, 4-*j*; and adder means 12-*j* for adding the output signal thereof to the second phase compensation amount to and outputting the first phase compensation amount to the phase compensator means 10-*j*.

The second phase compensation amount signifies a required amount of phase compensation to be made for the output of the phase compensator means 10-*j*. The whole first phase compensation amount for the second receiver 4-*j* is obtained by adding, in the adder means 12-*j*, the current phase compensation amount, i.e., the output of the adder means, to the second phase compensation amount which is the output from the phase compensation calculator means 8-*j*.

The phase compensator means 8-*j* executes a phase compensation for the output of the second receiver 4-*j* on the basis of the first phase compensation amount, whereby the output of the phase compensator means 10-*j* is rendered equal to Eq. (3). Consequently, the beam former 6 is supplied with uniform-phase signals to thereby enhance the beam pattern forming efficiency in the case of a multi-beam antenna.

The phase compensation calculator means 8-*j* may comprise a control means for producing a control signal to signify that the output of the first receiver 4-1 and the output of the phase compensator means 10-*j* are based on an up-signal which, out of up-signals from the mobile stations positioned in the sector to which the first and second antenna elements are directed, belongs to a population where the phase-rotation average value indicative of the phase difference between the output signal of the first antenna element 2-1 and that of the second antenna element 2-*j* is a known value; and an averaging means for calculating, in response to the control signal, a required phase compensation amount which corresponds to the difference between the known value and the average value of the phase difference between the output signal of the first receiver 4-1 and that of the phase compensator means 10-*j*.

The control means may generate a control signal to indicate that the output signal is based on an up-signal under inter-sector handover to the mobile station positioned in the vicinity of the border between one sector, to which the first and second antenna elements 2-1, **2-*j*** are directed, and a specific sector adjacent thereto. And the averaging means may adopt, as the known values, those obtained previously on the basis of the average position of the mobile station relevant to the inter-sector handover and also the positions of the first and second antenna elements.

Supposing that an up-signal is plane waves, generally the phase rotation quantity of the output of the second antenna element **2-*j* to the output of the first antenna element 2-1 is calculated on the basis of the arrival angle of the up-signal to the direction of arrangement of the first and second antenna elements 2-1, 2-*j***.

Therefore the known value $\Delta\Theta_j$ can be obtained previously from the average position of the mobile-station population and the positions of the antenna elements 2-1, **2-*j***. The required amount of phase compensation is calculated by the use of such known value $\Delta\Theta_j$, and then a proper phase compensation is executed.

The control means may generate a control signal to indicate that the output signal is based on an up-signal under inter-sector handover to the mobile station positioned within a fixed range from a specific center which is spaced apart by a fixed distance from the radio base station in the cellular mobile communication system. And the averaging means may adopt, as the known values, those obtained previously on the basis of the specific center position and the positions of the first and second antenna elements.

The control means may generate a control signal to indicate that the output signal is based on an up-signal where the level difference between the output signal of any third antenna element, which is directed to a specific sector adjacent to the first sector to which the first and second antenna elements 2-1, **2-*j*** are directed, and the output signal of any fourth antenna element directed to the first sector, is below a threshold value. And the averaging means may adopt, as the known values, those obtained previously on the basis of the average position of the mobile station where the level difference is below the threshold value, the positions of the first and second antenna elements, and the radiation patterns of the third and fourth antenna elements.

Since each of the third and fourth antenna elements forms a particular radiation pattern, the up-signal, where the level difference between the output signal of one antenna element directed to the adjacent sector and the output signal of the other antenna element directed to the first sector, is presumed to be the up-signal from the vicinity of the border with the adjacent sector. Therefore the phase rotation quantity $\Delta\Theta_j$ can be presumed, by previously calculating the range of the vicinity of such border, from the average position thereof and the positions of the first and second antenna elements 2-1 and **2-*j***.

The control means may generate a control signal to indicate that the output signal is based on an up-signal where the level differences between the output signals of third and fourth antenna elements, which are directed respectively to two sectors adjacent to the first sector to which the first and second antenna elements 2-1, **2-*j* are directed, and the output signal of any fifth antenna element directed to the first sector, are both above a threshold value. And the averaging means may adopt, as the known values, those obtained previously on the basis of the average position of the mobile station where the level differences are both above the threshold value, the positions of the first and second antenna elements 2-1, 2-*j***, and the radiation patterns of the third, fourth and fifth antenna elements.

The up-signal where the level differences are both above the threshold value is presumed to be positioned in the vicinity of the central direction of the sector, so that the phase rotation quantity $\Delta\Theta_j$ can be estimated from the average position in the vicinity and the positions of the first and second antenna elements 2-1, **2-*j***. And a required amount of phase compensation can be calculated by the use of such phase rotation quantity $\Delta\Theta_j$.

Further the radio base station may comprise a signal generator for transmitting a signal from a known position within the sector to which the first and second antenna elements are directed, wherein the phase compensation calculator means **8-*j* calculates a phase compensation amount or a second phase compensation amount by the use of the up-signal from the signal generator on the basis of the phase difference which is existent between the output signal of the first antenna element 2-1 and the output signal of the second antenna element 2-*j*** and is obtained from the known position of the signal generator and the positions of the first and second antenna elements.

Further the radio base station may comprise a signal generator for transmitting a signal from a known position within the sector to which the first and second antenna elements 2-1, **2-*j* are directed, wherein the phase compensation calculator means calculates a phase compensation amount or a first phase compensation amount by the use of the output signals of the first and second receivers relative to the signal from the signal generator, on the basis of the phase difference which is existent between the output signals of the first and second antenna elements 2-1, 2-*j* and is obtained from the known position of the signal generator and the positions of the first and second antenna elements 2-1, 2-*j***.

Further the radio base station may comprise a signal generator for generating a signal of the same radio band as that used in the cellular mobile communication system and outputting the generated signal to a signal line; a first output means for outputting to the first receiver 4-1 a first signal based on the signal from the signal line; and a second output means for outputting to the second receiver **4-*j* a second signal based on the signal from the signal line; wherein the phase compensation calculator means calculates the phase compensation amount or the first phase compensation amount by the use of the output signals of the first and second receivers 4-1, 4-*j*** relative respectively to the first and second signals, on the basis of the known phase difference between the first and second signals.

Further the radio base station may comprise a switch means for outputting to the second receiver **4-*j* either the first signal based on the output signal of the first antenna element 2-1 or the output signal of the second antenna element 2-*j*, wherein the phase compensation calculator means calculates the phase compensation amount or the first phase compensation amount by the use of the output signal of the first receiver 4-1 and the output signal of the second receiver 4-*j* relative to the first signal, on the basis of the known phase difference between the output signal of the first antenna element 2-1** and the first signal.

Embodiment 1

Figure 4:
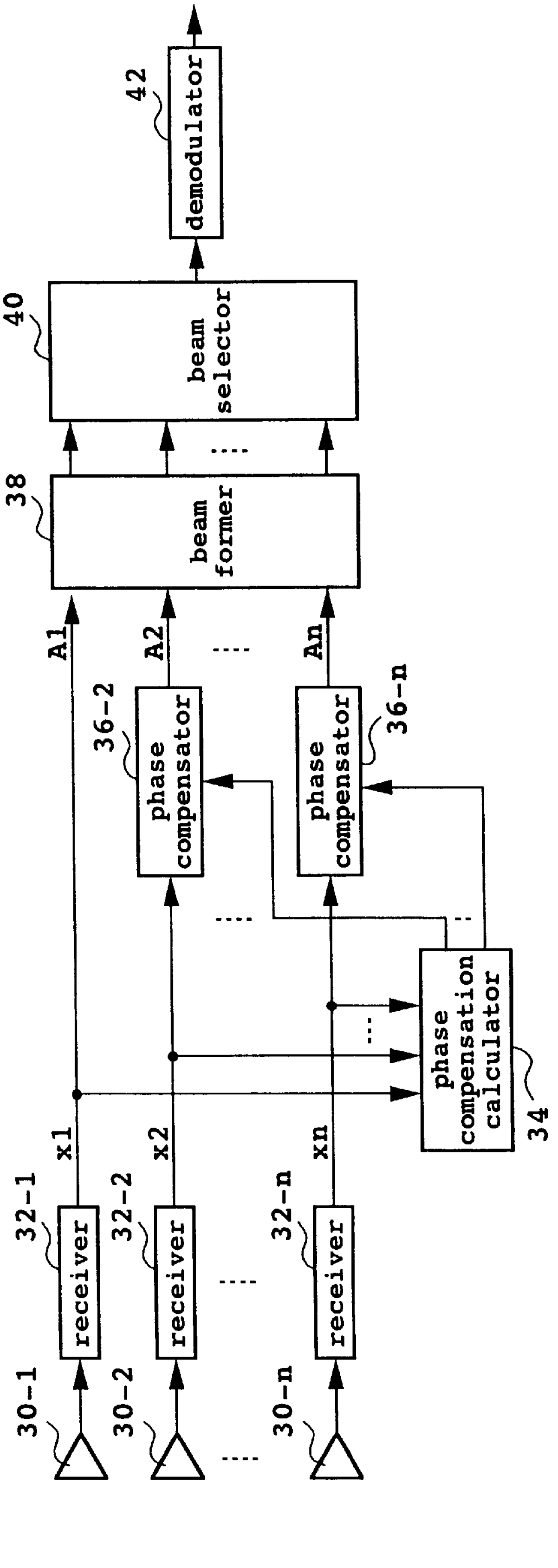
FIG. 4 is a functional block diagram of a radio base station according to Embodiment 1 of the invention.

FIG. 4 is a block diagram of a radio base station according to Embodiment 1 of the present invention.

As shown in this diagram, the radio base station constitutes a TDMA cellular mobile communication system for example, and it comprises a plurality of antenna elements **30-*k* (k=1~n) directed to a same sector, receivers 32-*k* (k=1~n) provided correspondingly to branches of the antenna elements 30-*k*, a phase compensation calculator 34, phase compensators 36-*j* (j=2~n), a beam former 38, a beam selector 40, and a demodulator 42**.

Figure 5:
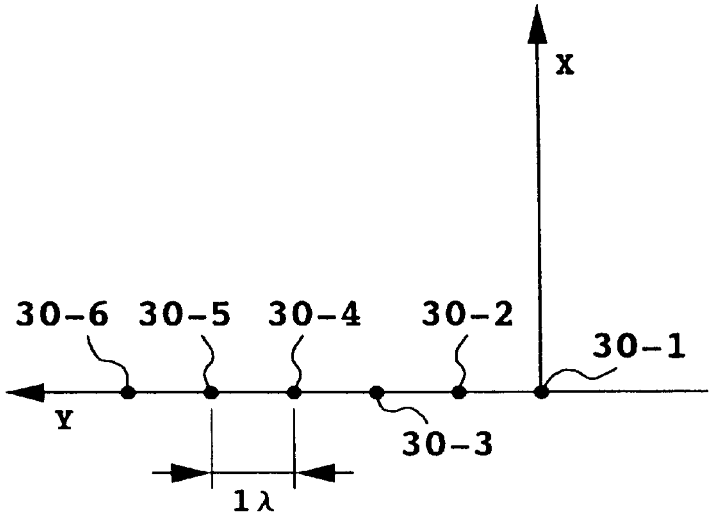
FIG. 5 shows an arrangement of antenna elements included in FIG. 4.
Figure 6:
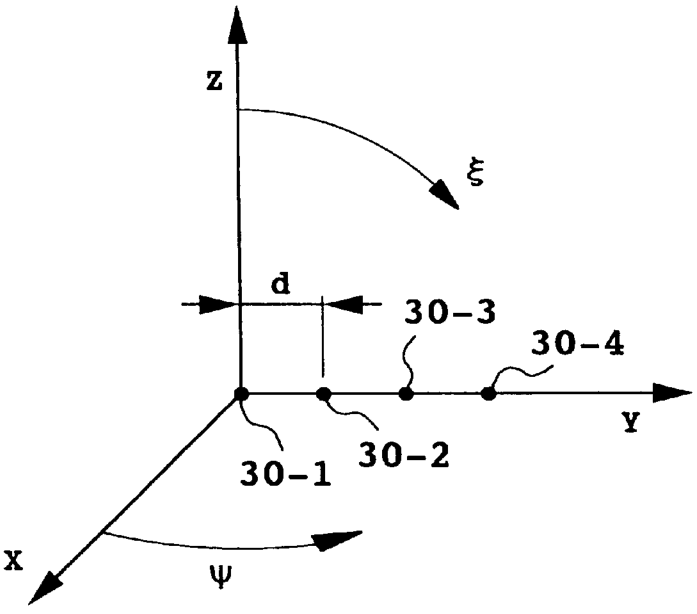
FIG. 6 shows a linear array coordinate system.

FIG. 5 shows an arrangement of the antenna elements included in FIG. 4, and FIG. 6 shows a linear array coordinate system. As shown in FIGS. 5 and 6 where an X-axis indicates the central direction of a sector and a Y-axis is orthogonal to the X-axis on a horizontal plane, the antenna elements 30-*k* (k=1~n) are arranged in the Y-axis direction so as to be directed to the sector. A Z-axis in FIG. 6 is directionally orthogonal to the X-axis and the Y-axis in a manner to form a right-handed system.

In the linear array system, normally the antenna elements 30-*k* (k=1~n) are arranged equidistantly at an interval d (e.g., equal to the wavelength $\lambda$ of an up-signal to be received). Hereinafter a description will be given with regard to one reference antenna element 30-1 which is disposed at the origin of the linear array coordinate system. In FIG. 6, $\psi$ denotes an angle formed by the X-axis and a straight line connecting the origin to the relevant mobile station, and $\xi$ denotes an angle formed by the Z-axis and a straight line connecting the origin to the mobile station.

The receivers 32-*k* (k=1~n) extract predetermined frequency components from the output signals of the antenna elements 30-*k* and produce digital orthogonal baseband signals Ik and Qk. Each receiver consists of an LNA and a heterodyne receiving circuit including an AGC circuit.

Figure 7:
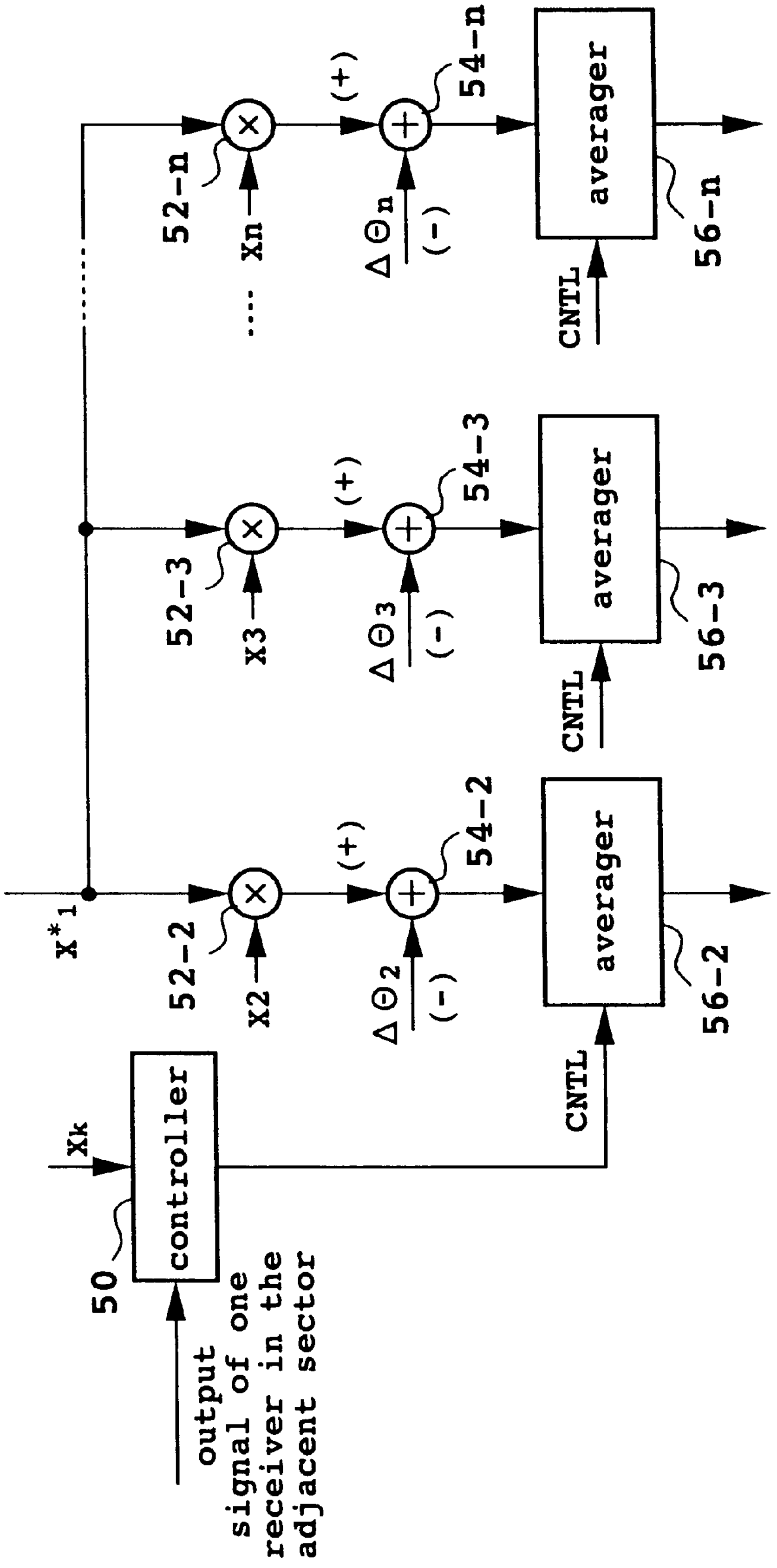
FIG. 7 is a circuit block diagram of a phase compensation calculator included in FIG. 4.

FIG. 7 is a circuit block diagram of the phase compensation calculator included in FIG. 4. As shown in this diagram, the phase compensation calculator 34 has a controller 50, multipliers 52-*j* (j=2~n), adders 54-*j* (j=2~n) and averagers 56-*j* (j=2~n). The controller 50 is a circuit to produce a control signal CNTL for selecting the output signals of the adder 54-*j* whose average value is to be taken in the averagers 56-*j* (j=2~n). The circuit configuration of this controller is selectively changed in accordance with the signals whose average value is to be taken.

For example, when a user signal under inter-sector handover to a specific adjacent sector is selected, the controller 50 is so constituted as to produce a control signal CNTL which signifies that the power of the output signal Xk of one receiver 32-*k* and the power of the output signal of one receiver in the adjacent sector are at a level sufficient for inter-sector handover.

The multiplier 52-*j* (j=2~n) is a circuit for multiplying a complex conjugate X*1 (=I1−$(-1)^{1/2}$Q1)) of the output signal X1 of the receiver 32-1 by the output signal Xj (=Ij+$(-1)^{1/2}$Qj)) of the receiver 32-*j*. The adder 54-*j* calculates a phase argYj of the output Yj of the multiplier 52-*j* and then subtracts, from this phase argYj, the average value $\Delta\Theta_j$ of the phase rotation quantity of the received signal of the antenna element 30-*j* to the received signal of the antenna element 30-1 calculated previously in the undermentioned manner on the basis of the average position of the relevant mobile station whose average value is obtained in the averager 56-*j*. The position of the adder 54-*j* may be posterior to the averager 56-*j* as well.

Suppose now that, in the coordinate system of FIG. 6, an up-signal has been received by each antenna element 30-*j* (j=2~n) from the ith user whose mobile station is at a position having an angle $\psi_i$ from the X-axis and an angle $\xi_i$ from the Z-axis. On the assumption that the up-signal is composed of plane waves, the antenna element 30-1 is at the origin and the antenna element 30-*j* is spaced apart from the origin by a distance d(j−1), then the phase rotation quantity $\Delta\theta_{ij}$ of the received signal of the antenna element 30-*j* to the received signal of the antenna element 30-1 based on the ith user signal is expressed as Eq. (6).

$$\Delta\theta_{ij}=(2\pi/\lambda)(j-1)d\sin\psi_i\cdot\sin\xi_i \quad (6)$$

where $\lambda$: wavelength of up-signal from mobile station

The average value $\Delta\Theta_j$(j=2~n) represents the average of the phase rotation quantities $\Delta\theta_{ij}$ regarding a plurality of relevant users. This value $\Delta\Theta_j$ is calculated previously by specifying the relevant range for determination of the average value and inserting into Eq. (6) the average position of the users within the relevant range.

Each averager 56-*j* (j=2~n) has a delay circuit and an averaging circuit which are not shown. The delay circuit serves to synchronize the control signal CNTL of the controller 50 with the output of the adder 54-*j* by delaying the output of the adder 54-*j* for the delay time of the control signal CNTL to the output of the adder 54-*j*. And the averaging circuit calculates a temporal average value with respect to the output of the delay circuit when the control signal CNTL is active to indicate selection.

Figure 8:
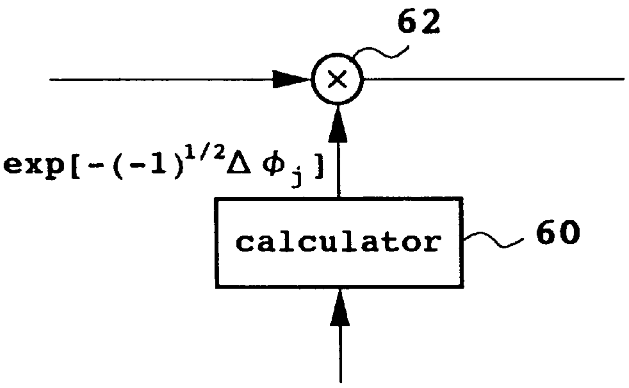
FIG. 8 is a circuit block diagram of a phase compensator included in FIG. 4.

FIG. 8 shows the circuit of the phase compensator included in FIG. 4. The phase compensator 36-*j* compensates the phase of the output Xj of the receiver 32-*j* by the phase correction amount $\Delta\phi_j$ calculated in the phase compensation calculator 34. As shown in FIG. 8, the phase compensator 36-*j* has a calculating circuit 60 for obtaining $\exp[-(-1)^{1/2}\Delta\phi_j]$ from the phase compensation amount $\Delta\phi_j$, and the multiplier 62 for obtaining $Xj\cdot\exp[-(-1)^{1/2}\Delta\phi_j]$.

The beam former 38 is a digital signal processing circuit which form a multi-beam and serves to synthesize the output X1(A1) of the receiver 32-1 and the phase-compensated output Aj of the phase compensator 36-*j* (j=2~n) by giving adequate amplitude weights and phase rotations thereto to form a desired beam pattern.

The beam selector 40 selects the highest-level beam of the desired user signal from the plural outputs of the beam former 38. And the demodulator 42 is a circuit for demodulating the modulated signal of $\pi/4$ shift QPSK or the like.

Hereinafter the operation of the radio base station in Embodiment 1 will be described with reference to the diagrams mentioned above.

For example, a user up-signal directed to the sector denoted by oblique lines in FIG. 2 is received by the antenna element 30-*k* (k=1~n), and then the input signal is supplied to the receiver 32-*k*. Subsequently in the receiver 32-*k*, the input signal is low-noise amplified by an LNA, amplitude-equalized by an AGC and then is converted into orthogonal digital signals Ik, Qk by a heterodyne receiving circuit. The output Xk of the receiver 32-*k* based on the user signal is expressed as Eq. (7) given below.

$$Xk=\exp[(-1)^{1/2}(\alpha_i(t)+(k-1)\Delta\theta_i+\phi_k)] \quad (7)$$

where $\alpha_i(t)$: phase in each receiving path of ith user signal $\Delta\theta_i$: phase rotation determined by antenna element interval d and arrival angle from ith user with X1 as reference $\phi_k$: phase including phase deviation of receiver 32-*k*

Since the amplitude deviation is compensated by the AGC, the amplitude is maintained constant. The output X1 of the receiver 32-1 is supplied to the beam former 38, and the complex conjugate X*1 of the output X1 is inputted to the phase compensation calculator 34. The output Xj of the receiver 32-*j* (j=2~n) is supplied to the phase compensation calculator 34 and the phase compensator 36-*j*.

Meanwhile the controller 50 in FIG. 7 is supplied with the output Xk of one receiver 32-*k* (i=1~n) and the output of the receiver relative to the received signal of one antenna element directed to the adjacent sector, then produces a control signal CNTL for selecting the user up-signal in the undermentioned range, and outputs the control signal CNTL to the averager 56-*j* (j=2~n).

Figure 9:
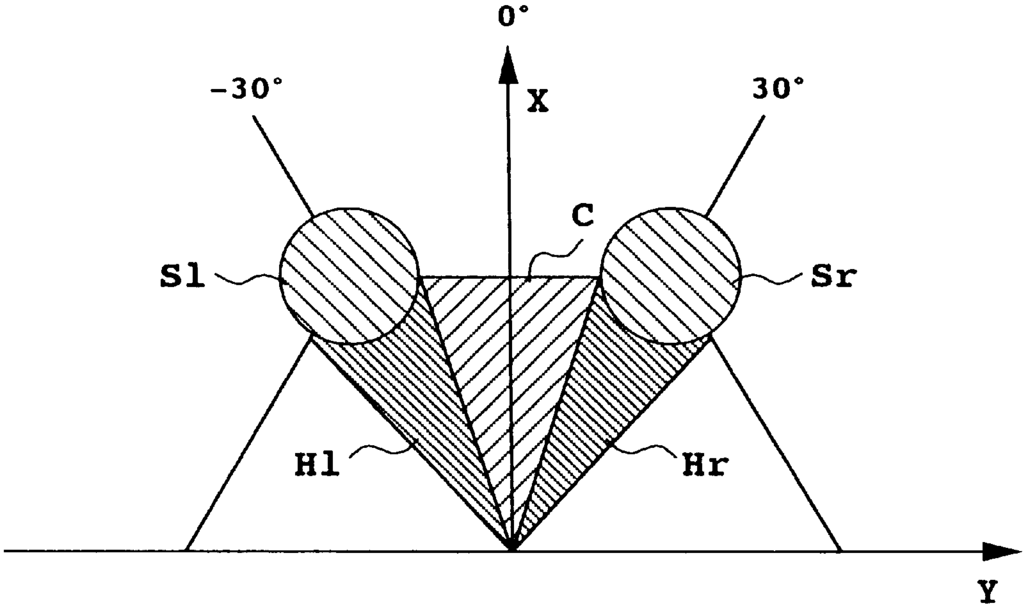
FIG. 9 shows the areas of user signals to be selected.

FIG. 9 shows users to be selected.

As shown in this diagram, the following users are selected.

User Hr under inter-sector handover to right adjacent sector

User Hi under inter-sector handover to left adjacent sector

User Sr in upper right area and under inter-cell handover

User Sl in upper left area and under inter-cell handover

User C in sector except users Hr, Hl, Sr and Sl (a) User Hr under inter-sector handover to right adjacent sector The controller 50 activates the control signal CNTL when the power of the output Xk of one receiver 32-*k* (e.g., power of the detected output Xk) and the power of the output Xr of the receiver relative to the received signal of one antenna element directed to the right adjacent sector are at a level sufficient for inter-sector handover. Meanwhile in any other state, the controller 50 inactivates the control signal CNTL. And the control signal is outputted to the averager 56-*j* (j=2~n).

In this case, it is found by averaging that the signal of the user Hr arrives directionally from the border with the right adjacent sector. More specifically, the user signal arrives from a position having an angle $\psi$=30° and spaced apart from the radio base station by a distance l.

Therefore, it is presumed that $\Delta\theta_{ij}$ of Eq. (6), when averaged, is equal to the phase rotation quantity of the user signal positioned at $\psi$=30° and spaced apart from the radio base station by a distance l. Consequently, $\Delta\Theta_j$ can be obtained by previously calculating the phase rotation quantity.

Figure 10:
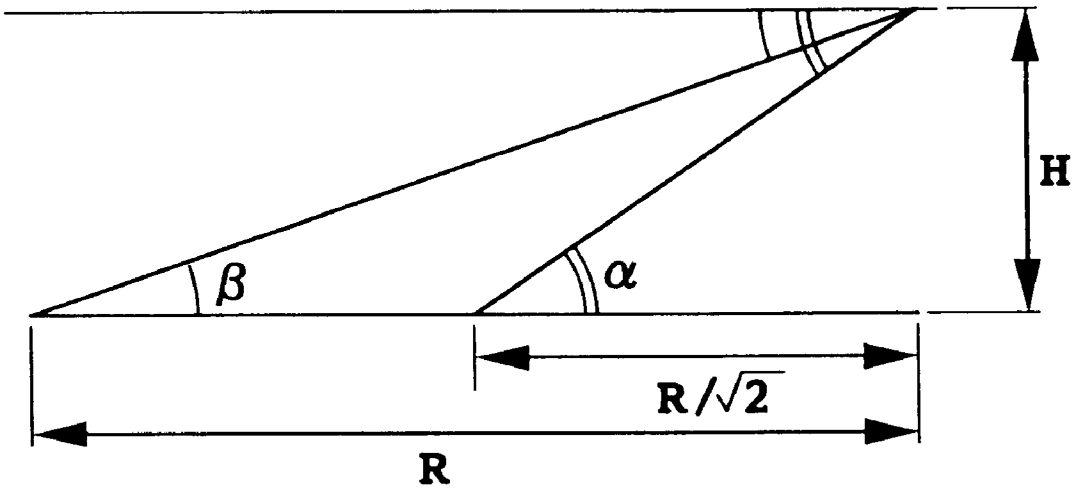
FIG. 10 shows a method of calculating a phase rotation quantity.

FIG. 10 shows a method of calculating the phase rotation quantity. Since the radio base station manages, as a cell, each area having a radius R from the center, the user under inter-sector handover is presumed to be positioned on average at a distance of $l=R/\sqrt{2}$ from the radio base station. As shown in FIG. 10, when the antenna element 30-*k* (k=1~n) in the radio base station has a height H, the inclination angle $\alpha$ of the antenna element 30-*k* viewed from the user spaced apart by a distance of $R/\sqrt{2}$ from the radio base station is expressed as Eq. (8) given below.

$$\alpha = \tan^{-1}\left(\sqrt{2}H/R\right) \tag{8}$$

Therefore, the coordinates of the user position are denoted by $(\psi_i, \xi_i)=(\pi/6, \alpha+\pi/2)$ in the coordinate system of FIG. 6. And $\Delta\Theta_j$ is calculated by inserting the above into Eq. (6). Such $\Delta\Theta_j$ is inputted to a (−) terminal of the adder 54-*j* in FIG. 7. Meanwhile the multiplier 52-*j* multiplies the complex conjugate X*1 of the receiver 32-1 by the output Xj of the receiver 32-*j*, and then supplies the output Yj of the multiplier 52-*j* shown in Eq. (9) below to the adder 54-*j*.

$$Yj=Xj\cdot X^*1=\exp[j(\phi_j-\phi_1+(j-1)\Delta\theta_i)] \tag{9}$$

The adder 54-*j* inputs the phase argYj($-\pi\leqq$argYj$\leqq\pi$) of the output Yj of the multiplier 52-*j* to a (+) terminal while inputting the average value $\Delta\Theta_j$ of $(j-1)\Delta\theta_i$ to a(−) terminal to thereby calculate argYj$-\Delta\Theta_j$, and then outputs the same to the averager 56-*j*. The averager 56-*j* delays the supplied output of the adder 54-*j* by the delay circuit to synchronize the same with the control signal CNTL. And when the control signal CNTL is active, the averaging circuit takes a temporal average value of the stacked output of the adder 54-*j* and then outputs a phase compensation amount $\Delta\phi_j$ to the phase compensator 36-*j* in FIG. 4.

Figure 11A:
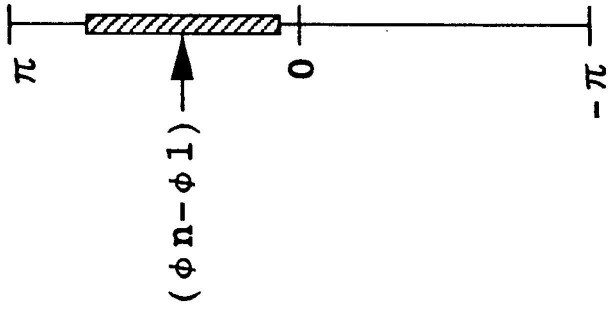
FIG. 11A shows a method of calculating a phase compensation amount.
Figure 11B:
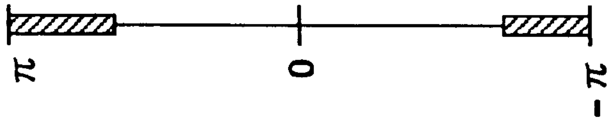
FIG. 11B shows a method of calculating a phase compensation amount.
Figure 11C:
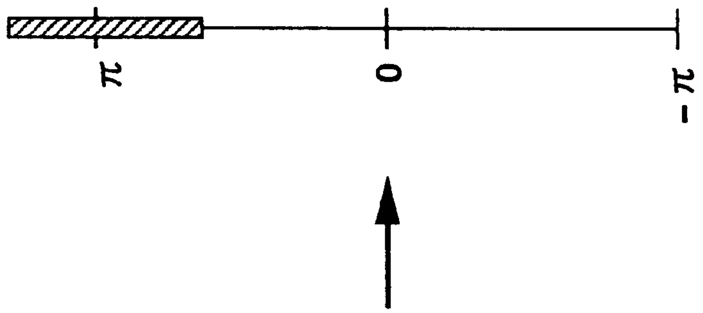
FIG. 11C shows a method of calculating a phase compensation amount.
Figure 11D:
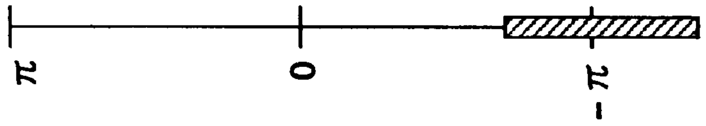
FIG. 11D shows a method of calculating a phase compensation amount.

The average value of the phase $(\phi_j-\phi_1+(j-1)\Delta\theta_i)$ in Eq. (9) is presumed to be $(\phi_j-\phi_1+\Delta\Theta_j)$, so that the output $\Delta\phi_j$ of the averager 56-*j* becomes equal to $(\phi_j-\phi_1)$. Since $-\pi\leqq$argYj$-\Delta\Theta_j\leqq\pi$, no problem arises if a set of {argYj$-\Delta\Theta_j$} is continuous as shown in FIG. 11A. However, if the set is separate, as shown in FIG. 11B, into a first part where $\pi$ is an upper limit and a second part where $-\pi$ is a lower limit, a correct result fails to be obtained when the average value is calculated therefrom. For this reason, the averager 56-*j* first performs an adjustment to render the set continuous through shifting the second part by $2\pi$ as shown in FIG. 11C or shifting the first part by $-2\pi$ as shown in FIG. 11D, and then calculates the average value.

The phase compensator 36-*j* calculates $\exp[-j\Delta\phi_j]$ by the calculator 60 in FIG. 8 and then outputs the same to the multiplier 62. Subsequently the multiplier 62 multiplies the output Xj of the receiver 32-*j* by $\exp[-j\Delta\phi_j]$ and outputs Aj of Eq. (10) to the beam former 38.

$$\begin{aligned} Aj &= Xj\cdot\exp[-(-1)^{1/2}\Delta\phi_j] \\ &= \exp[(-1)^{1/2}(\alpha_i(t)+\phi_1+(j-1)\Delta\theta_i)] \end{aligned} \tag{10}$$

while, $$X1=A1=\exp[(-1)^{1/2}(\alpha_i(t)+\phi_1)] \tag{11}$$

Therefore, the phase term of the jth receiving path is equal to that of the reference 1st receiving path except the phase rotation term determined by the antenna arrangement and the arrival wave angle from each user, so that a required phase compensation is performed.

The beam former 38 is supplied with the output A1 (=X1) of the receiver 31-1 and the phase-compensated output Aj (j=2~n) thereof, and then executes digital signal processing by a multi-beam antenna or adaptive array antenna system. In the multi-beam antenna where the input phase has already been compensated, the beam forming efficiency is enhanced.

The beam selector 40 selects the highest-level beam of the desired user signal from the plural outputs of the beam former 38 and then outputs the selected beam to the demodulator 42. Subsequently the demodulator 42 demodulates the modulated signal of $\pi/4$ shift QPSK or the like.

(b) User Hl under inter-sector handover to left adjacent sector

It is found by averaging that the signal of the user Hl arrives directionally from the border with the left adjacent sector. More specifically, the user signal arrives from a position having an angle $\psi$=30° and spaced apart from the radio base station by a distance $R/\sqrt{2}$. Therefore, the coordinates of the user position are denoted by $(\psi_i, \xi_i)=(-\pi/6, \alpha+\pi/2)$ in the coordinate system of FIG. 6. And the average value $\Delta\Theta_j$ is obtained by inserting the above into Eq. (6).

In the same manner as in the foregoing case (a), the phase compensation amount $\Delta\Theta_j$ is calculated in the phase compensation calculator 34 by the use of such $\Delta\Theta_j$, and $Xj\cdot\exp[-(-1)^{1/2}\Delta\phi_j]$ is calculated in the phase compensator 36-*j* with regard to Xj and then is outputted to the beam former 38.

(c) User Sr in upper right area and under inter-cell handover

It is found by averaging that the signal of the user Sr arrives directionally from the center. More specifically, the user signal arrives from a position having an angle $\psi$=30° and spaced apart from the radio base station by a distance R. Therefore, the coordinates of the user position are denoted by $(\psi_i, \xi_i)=(\pi/6, \beta+/2)$ ($\beta=\tan^{-1}$ (H/R)) in the coordinate system of FIG. 10. And the average value $\Delta\Theta_j$ is obtained by inserting the above into Eq. (6).

In the same manner as in the foregoing case (a), the phase compensation amount $\Delta\phi_j$ is calculated in the phase compensation calculator 34 by the use of such $\Delta\Theta_j$, and Xj·exp $[-j\Delta\phi_j]$ is calculated in the phase compensator 36-*j* with regard to Xj and then is outputted to the beam former 38.

(d) User Sl in upper left area and under inter-cell handover

It is found by averaging that the signal of the user Sl arrives directionally from the center. More specifically, the user signal arrives from a position having an angle $\psi=-30°$ and spaced apart from the radio base station by a distance R. Therefore, the coordinates of the user position are denoted by $(\psi_i, \xi_i)=(-\pi/6, \beta+\pi/2)$ ($\beta=\tan^{-1}$ (H/R)) in the coordinate system of FIG. 10. And the average value $\Delta\Theta_j$ is obtained by inserting the above into Eq. (6).

In the same manner as in the foregoing case (a), the phase compensation amount $\Delta\Theta_j$ is calculated in the phase compensation calculator 34 by the use of such $\Delta\phi_j$, and Xj·exp $[-j\Delta\phi_j]$ is calculated in the phase compensator 36-*j* with regard to Xj and then is outputted to the beam former 38.

(e) User C

It is found by averaging that the signal of the user C arrives from the central direction of the sector. More specifically, the user signal arrives from a position having an angle $\psi=0°$ and spaced apart from the radio base station by a distance $R/\sqrt{2}$. Therefore, the coordinates of the user position are denoted by $(\psi_i, \xi_i)=(0, \alpha+\pi/2)$. And the average value $\Delta\Theta_j=0$ is obtained by inserting the above into Eq. (6).

In the same manner as in the foregoing case (a), the phase compensation amount $\Delta\phi_j$ is calculated in the phase compensation calculator 34 by the use of such $\Delta\Theta_j=0$, and Xj·exp$[-j\Delta\phi_j]$ is calculated in the phase compensator 36-*j* with regard to Xj and then is outputted to the beam former 38.

According to Embodiment 1 described above, a phase compensation amount is calculated in the phase compensation calculator 34, and a required phase compensation is executed in the phase compensator 36-*j* for the output Xk of the receiver 32-*j*, so that compensated-phase signals are inputted to the beam former 38 to consequently enhance the beam forming efficiency in the case of a multi-beam antenna system. Meanwhile in the case of an adaptive antenna system, it is possible in the beam former to execute separation of phase deviation, adaptive processing amplitude and phase controlled variable, so that in a transmission mode, transmission beam forming can be carried out on the basis of the phase deviation obtained in a reception mode.

Embodiment 2

Figure 12:
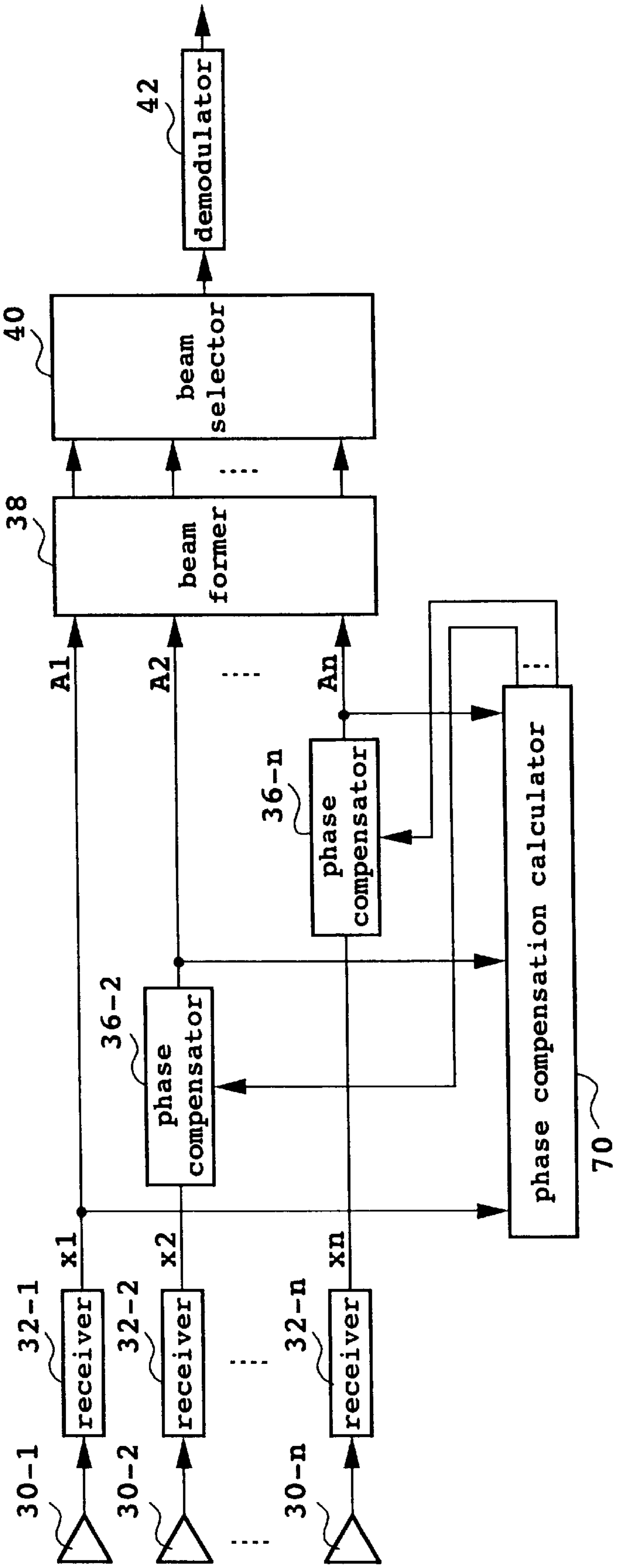
FIG. 12 is a functional block diagram of a radio base station according to Embodiment 2 of the invention.

FIG. 12 is a block diagram of a radio base station according to Embodiment 2 of the present invention, wherein any components corresponding functionally to those shown in FIG. 4 are denoted by like reference numerals. As shown in this diagram, the radio base station constitutes a TDMA cellular mobile communication system for example and comprises a plurality of antenna elements 30-*k* (k=1~n) directed to a same sector, receivers 32-*k* (k=1~n), a phase compensation calculator 70, phase compensators 36-*j* (j=2~n), a beam former 38, a beam selector 40, and a demodulator 42.

Figure 13:
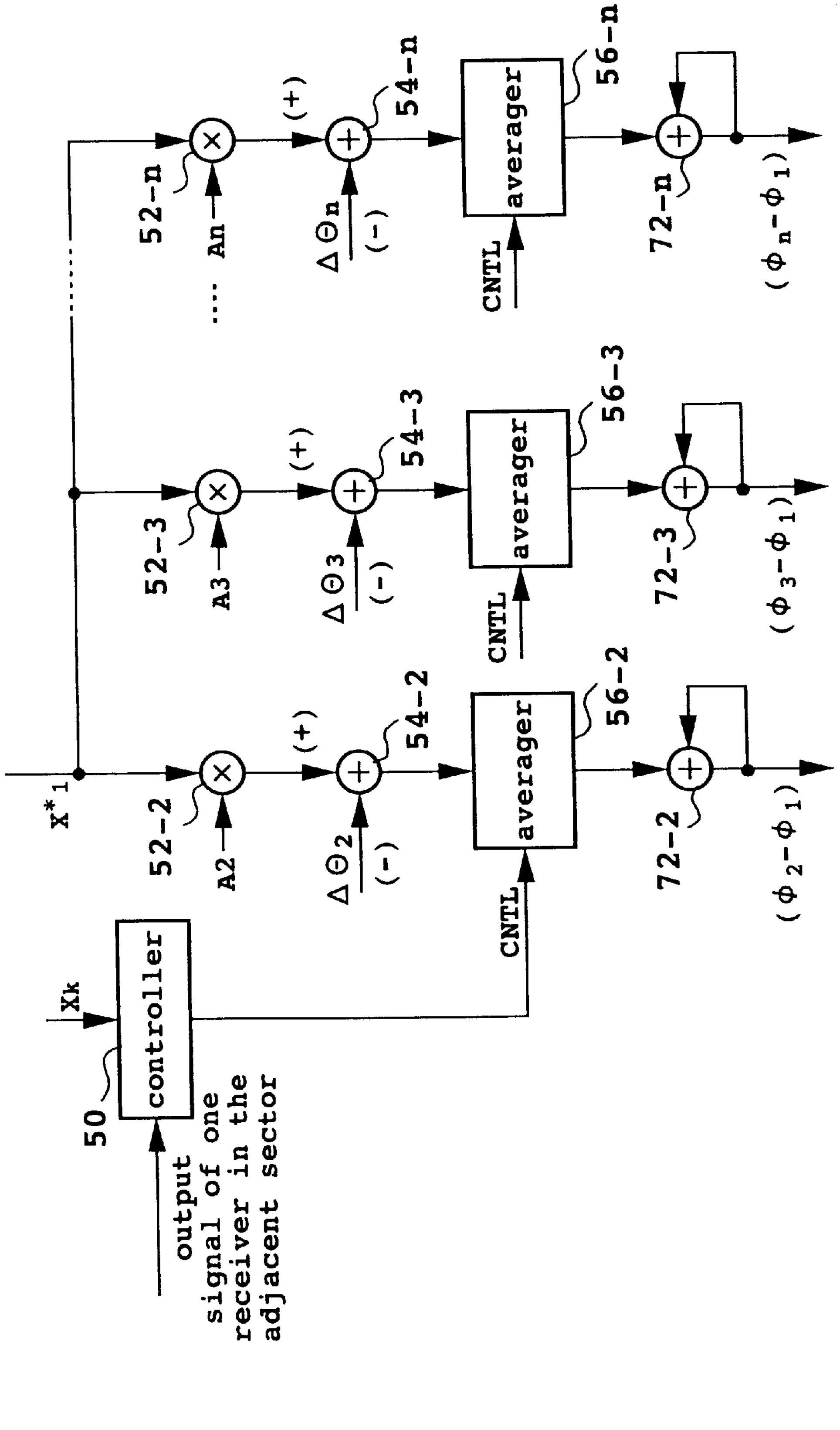
FIG. 13 is a circuit block diagram of a phase compensation calculator included in FIG. 12.

All of the antenna elements 30-*k*, receivers 32-*k* (k=1~n), phase compensators 36-*j* (j=2~n), beam former 38, beam selector 40 and demodulator 42 are the same as those shown in FIG. 4. Therefore a repeated explanation thereof is omitted here. FIG. 13 is a circuit block diagram of the phase compensation calculator included in FIG. 12, wherein any components corresponding functionally to those shown in FIG. 7 are denoted by like reference numerals.

As shown in this diagram, the phase compensation calculator 70 has a controller 50, multipliers 52-*j* (j=2~n), adders 54-*j* (j=2~n), averagers 56-*j* (j=2~n) and adders 72-*j* (j=2~n). Since the controller 50 is the same as that in FIG. 7, a repeated explanation thereof is omitted here. The multiplier 52-*j* (j=2~n) multiplies a complex conjugate X*1 of the output X1 of the receiver 32-1 by the output Aj of the phase compensator 54-*j*. The adders 54-*j* and the averagers 56-*j* (j=2~n) are the same as those in FIG. 7, and therefore a repeated explanation thereof is omitted here. The adder 72-*j* adds its output to the output of the averager 56-*j*.

Hereinafter the operation of the radio base station in Embodiment 2 will be described with reference to the diagrams mentioned above. For example, a user up-signal directed to the sector denoted by oblique lines in FIG. 2 is received by the antenna element 30-*k* (k=1~n), and then the input signal is supplied to the receiver 32-*k*. Subsequently in the receiver 32-*k*, the input signal is low-noise amplified by an LNA, amplitude-equalized by an AGC and then is converted into orthogonal digital signals Ik, Qk by a heterodyne receiving circuit.

The output X1 of the receiver 32-1 is supplied to the beam former 38, and the complex conjugate X*1 of the output X1 is inputted to the phase compensation calculator 70. The output Xj of the receiver 32-*j* (j=2~n) is supplied to the phase compensator 36-*j*. The phase compensator 36-*j* multiplies the output Xj of the receiver 32-*j* by $\exp[-j\Delta\rho_j]$ of the phase amount $\Delta\rho_j$ outputted from the phase compensation calculator 70, and then supplies its output Aj given by Eq. (12) to both the phase compensation calculator 70 and the beam former 38.

$$Aj=\exp[(-1)^{1/2}(\alpha_i(t)+(j-1)\Delta\theta_i\phi_j-\Delta\rho_j)] \tag{12}$$

The multiplier 52-*j* in the phase compensation calculator 70 multiplies X*1 by the output Aj of the phase compensator 36-*j*, and then supplies its output Yj given by Eq. (13) to the adder 54-*j*.

$$Yj=\exp[(-1)^{1/2}(\phi_j-\phi_1-\Delta\rho_j+(j-1)\Delta\theta_i)] \tag{13}$$

The adder 54-*j* subtracts the average value $\Theta_j$ of $(j-1)\Delta\theta_i$ from the phase $\arg Yj(-\pi\leqq\arg Yj\leqq\pi)$ of the output Yj of the multiplier 52-*j* inputted to a (+) terminal, and then outputs the result to the averager 56-*j*. The position of the adder 54-*j* may be posterior to the averager 56-*j* as well.

The averager 56-*j* calculates a temporal average value Zj (Eq. (14)) of the output of the adder 54-*j* and then supplies it to the adder 72-*j*.

$$Zj=\phi_j-\phi_1-\Delta\rho_j \tag{14}$$

The adder 72-*j* adds the phase compensation amount $\Delta\rho_j$, which is obtained therefrom at the current time point, to the output of the averager 56-*j* and supplies the result of such addition $(\phi_j-\phi_1)$ to the phase compensator 36-*j*. Subsequently the phase compensator 36-*j* executes phase compensation for the output Xj of the receiver 32-*j* on the basis of such phase compensation amount and then supplies its output to both the beam former 38 and the phase compensation calculator 70.

At this time point, the output Xj of the receiver 32-*j* has already been phase-compensated correctly by the phase compensator 36-*j*, so that the output of the averager 56-*j* is reduced to zero and therefore the output of the adder 72-*j* is kept unchanged. The beam former 38 is supplied with the output X1 of the receiver 32-1 and the phase-compensated output Aj (j=2~n), and executes digital signal processing by a multi-beam antenna or adaptive array antenna system. In the multi-beam antenna where the input phase has already been compensated, the beam forming efficiency is enhanced.

The beam selector 40 selects the highest-level beam of the desired user signal from the plural outputs of the beam former 38 and then outputs the selected beam to the demodulator 42. Subsequently the demodulator 42 demodulates the modulated signal of π/4 shift QPSK or the like.

According to Embodiment 2 described above, the beam forming efficiency is enhanced in the case of a multi-beam antenna system, as in Embodiment 1. Meanwhile in the case of an adaptive antenna system, it is possible in the beam former to execute separation of phase deviation, adaptive processing amplitude and phase controlled variable, so that in a transmission mode, transmission beam forming can be carried out on the basis of the phase deviation obtained in a reception mode.

Embodiment 3

Figure 14:
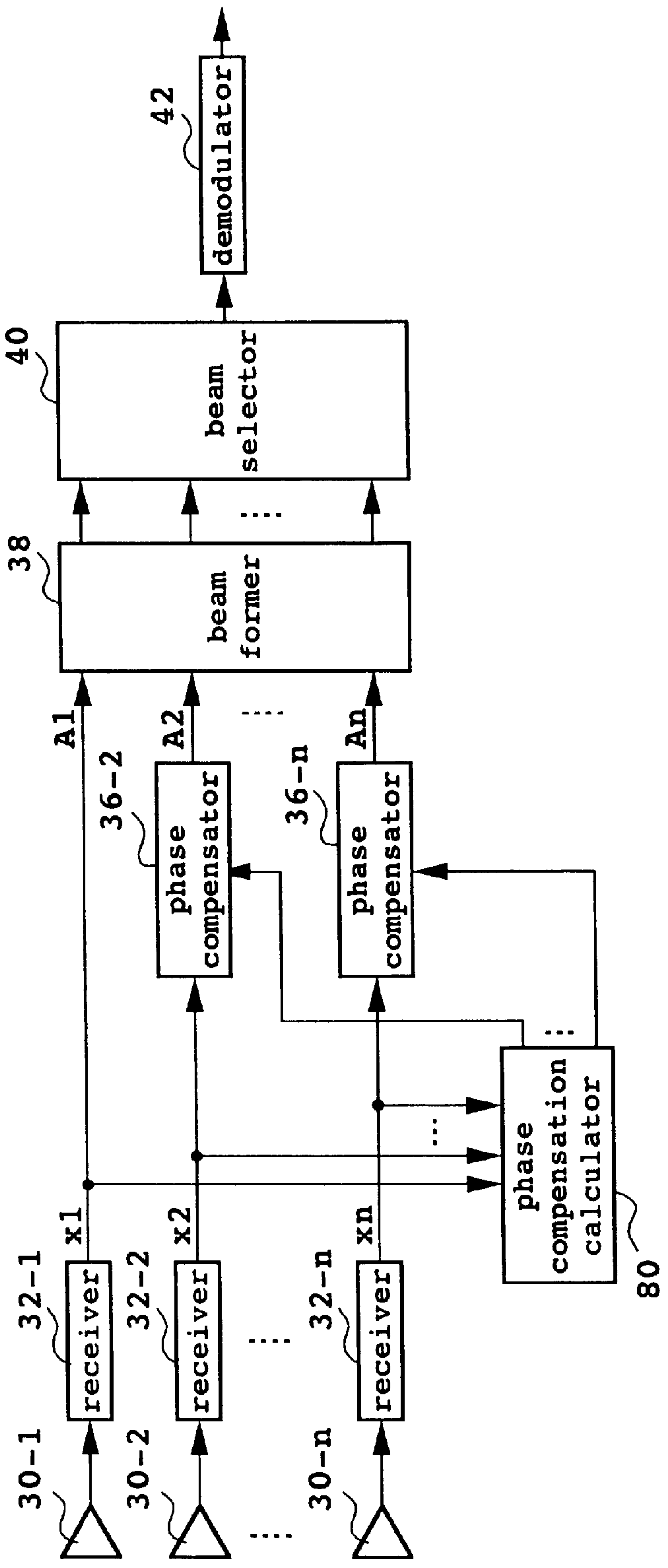
FIG. 14 is a functional block diagram of a radio base station according to Embodiment 3 of the invention.

FIG. 14 is a block diagram of a radio base station according to Embodiment 3 of the present invention, wherein any components corresponding functionally to those shown in FIG. 4 are denoted by like reference numerals. As shown in this diagram, the radio base station constitutes a TDMA cellular mobile communication system for example and comprises a plurality of antenna elements 30-*k* (k=1 ~n) directed to a same sector, receivers 32-*k* (k=1~n), a phase compensation calculator 80, phase compensators 36-*j* (j=2~n), a beam former 38, a beam selector 40, and a demodulator 42.

All of the antenna elements 30-*k*, receivers 32-*k* (k=1~n), phase compensators 36-*j* (j=2~n), beam former 38, beam selector 40 and demodulator 42 are the same as those shown in FIG. 4. Therefore a repeated explanation thereof is omitted here.

Figure 15:
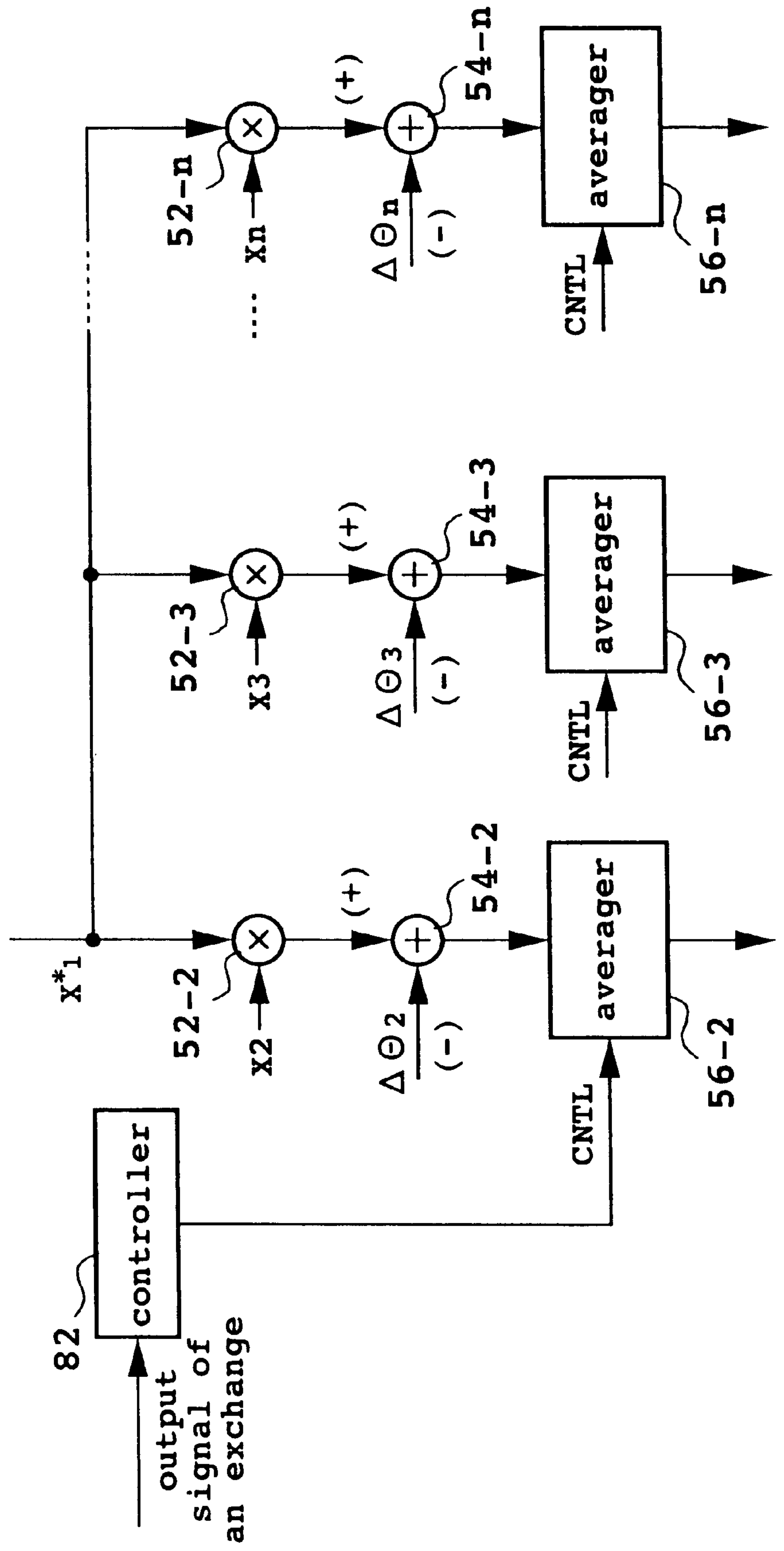
FIG. 15 is a circuit block diagram of a phase compensation calculator included in FIG. 14.

FIG. 15 is a circuit block diagram of the phase compensation calculator 80 included in FIG. 14, wherein any components corresponding functionally to those shown in FIG. 7 are denoted by like reference numerals. A controller 82 generates a control signal CNTL with regard to a specific up-signal at a known position and, in a time zone unused by the user, receives a signal which instructs selection of the user signal, via a communication line from an unshown exchange or the like managed by the base station, and then outputs the control signal CNTL to an averager 56-*j* (j=2~n).

The input $\Delta\Theta_j$ to the adder 54-*j* is a value calculated previously from Eq. (6) as will be described later on the basis of the known position u of the user signal and the location of the antenna element 30-*k*. All of the multipliers 52-*j*, adders 54-*j* and averagers 56-*j* are the same as those shown in FIG. 7, and therefore a repeated explanation thereof is omitted here. FIG. 16 shows the position of an up-signal generator. Hereinafter the operation of the radio base station in Embodiment 3 will be described with reference to the diagrams mentioned above.

In order to calculate a required phase compensation amount, a signal for instructing calculation of the phase compensation is supplied from an exchange or the like via a communication line to the controller 82 in the radio base station. In response to this signal, the controller 82 outputs a control signal CNTL, which instructs calculation of the phase compensation amount, to the averager 56-*j* (j=2~n).

Meanwhile an up-signal generated from the signal generator 84 located at the position u in FIG. 16 is received by the antenna element 30-*k* (k=1~n) in synchronism with the control signal CNTL, and then the input signal is supplied to the receiver 32-*k*. Subsequently in the receiver 32-*k*, the input signal is low-noise amplified by an LNA, amplitude-equalized by an AGC and then is converted into orthogonal digital signals Ik, Qk by a heterodyne receiving circuit. The output X1 of the receiver 32-1 is supplied to the beam former 38, and the complex conjugate X*1 of X1 is inputted to the phase compensation calculator 80. The output Xj of the receiver 32-*j* (j=2~n) is supplied to the phase compensator 36-*j*.

Figure 16A:
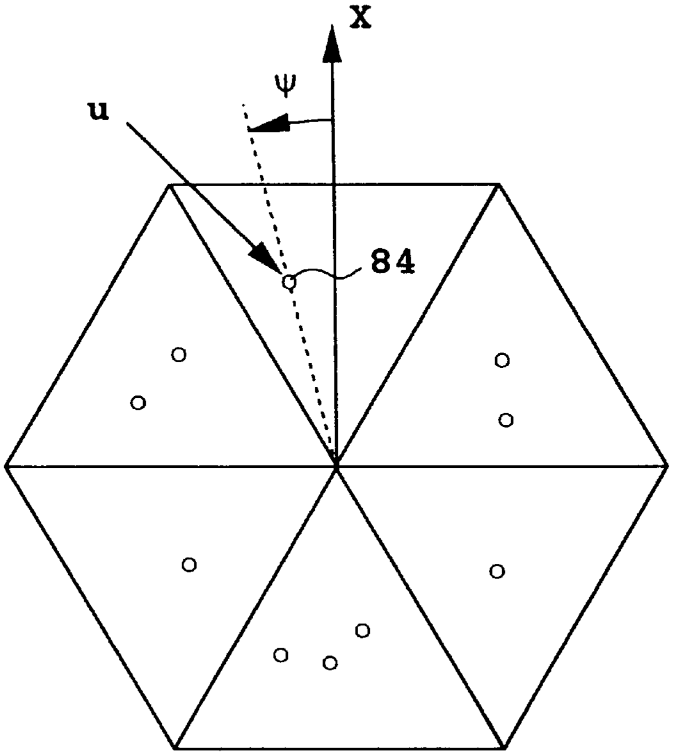
FIG. 16A shows the position of an up-signal generator.
Figure 16B:
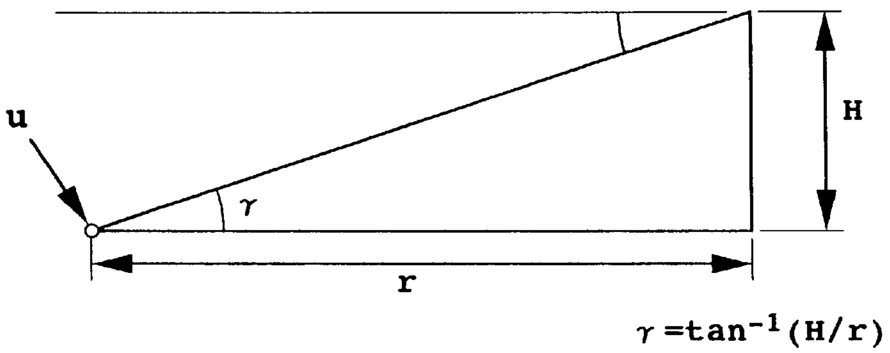
FIG. 16B shows the position of an up-signal generator.

The multiplier 52-*j* calculates X1* ·Xj and outputs the same to the adder 54-*j*. As shown in FIGS. 16A, 16B, the position u of the up-signal generator 84 forms an angle with the X-axis and has a distance r from the radio base station. And the antenna element 30-*k* has a height H. At the position u, $\xi=(\pi/2+\gamma)$ $(\gamma=\tan^{-1}(H/\gamma))$ as shown in FIG. 16B, and $\Delta\Theta_j$ obtained by inserting such ξ into Eq. (6) is inputted to the (−) terminal of the adder 54-*j*.

The adder 54-*j* subtracts $\Delta\Theta_j$, which is inputted to the (−) terminal thereof, from the phase $\arg Yj(-\pi \leqq \arg Yj \leqq \pi)$ of the output Yj of the multiplier 52-*j* inputted to the (+) terminal, and then outputs the result of such subtraction to the averager 56-*j*. The position of the adder 54-*j* may be posterior to the averager 56-*j* as well.

The averager 56-*j* calculates an average value of the output of the adder 54-*j* in response to the control signal CNTL obtained from the controller 80, and then outputs the phase compensation amount $\Delta\phi_j$ to the phase compensator 36-*j*. The purpose of calculating the average value in the averager 56-*j* is to enhance the precision of the phase compensation amount $\Delta\phi_j$, although the phase rotation quantity need not be presumed by taking a statistic average as in Embodiment 1 since the position of the up-signal generator 84 is known.

After calculation of the phase compensation amount $\Delta\phi_j$, a signal to instruct a halt of calculating the phase compensation amount is supplied from an exchange or the like to the controller 82 to thereby inactivate the control signal CNTL.

Meanwhile the user up-signal is received by the antenna element 30-*k* (k=1~n) and then is converted by the receiver 32-*k* into orthogonal baseband signals. The phase compensator 36-*j* executes phase compensation for the output Xj of the receiver 32-*j* (j=2~n) in accordance with the phase compensation amount $\Delta\phi_j$ calculated already by the phase compensation calculator 80, and then supplies the phase-compensated output to the beam former 38.

The beam former 38 is supplied with the output A1 (=X1) of the receiver 32-1 and the phase-compensated output Aj (j=2~n), and executes digital signal processing by a multi-beam antenna or adaptive array antenna system. In the multi-beam antenna where the input phase has already been compensated, the beam forming efficiency is enhanced.

The beam selector 40 selects the highest-level beam of the desired user signal from the plural outputs of the beam former 38 and then outputs the selected beam to the demodulator 42. Subsequently the demodulator 42 demodulates the modulated signal of π/4 shift QPSK or the like. According to Embodiment 3 described above, the same effects are achievable as in Embodiment 1.

Embodiment 4

Figure 17:
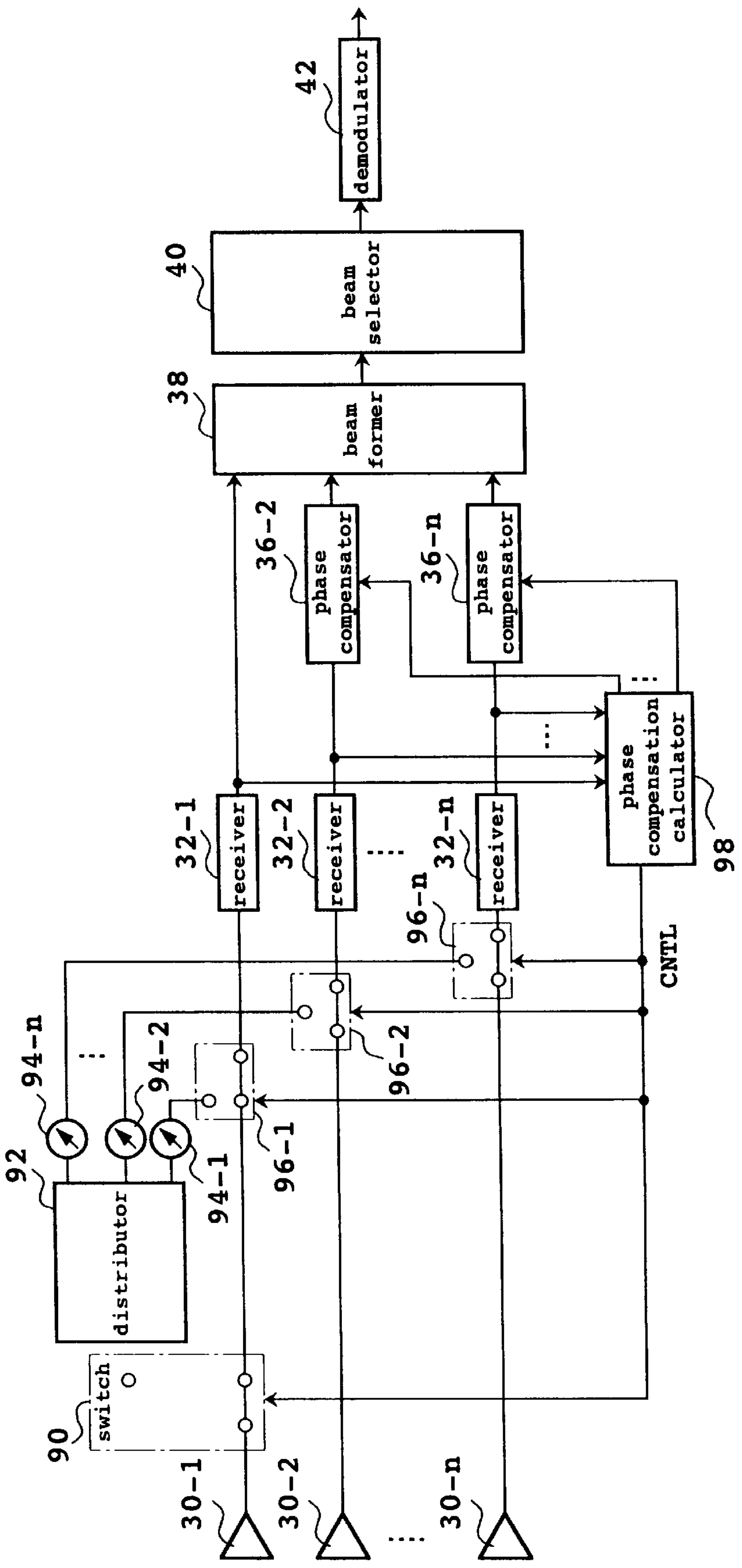
FIG. 17 is a functional block diagram of a radio base station according to Embodiment 4 of the invention.

FIG. 17 is a block diagram of a radio base station according to Embodiment 4 of the present invention, wherein any components corresponding functionally to those shown in FIG. 4 are denoted by like reference numerals.

As shown in this diagram, the radio base station constitutes a TDMA cellular mobile communication system for example and comprises a plurality of antenna elements 30-*k* (k=1~n) directed to a same sector, receivers 32-*k* (k=1~n), a switch circuit 90, a distributor 92, phase shifters 94-*k* (k=1~n), switch circuits 96-*k* (k=1~n), a phase compensation calculator 98, phase compensators 36-*j* (j=2~n), a beam former 38, a beam selector 40, and a demodulator 42.

All of the antenna elements 30-*k*, receivers 32-*k* (k=1~n), phase compensators 36-*j* (j=2~n), beam former 38, beam selector 40 and demodulator 42 are the same as those shown in FIG. 4. Therefore a repeated explanation thereof is omitted here. The switch circuit 90 serves to turn on or off the connection between the antenna element 30-1 and the distributor 92, and is controlled by a control signal CNTL outputted from the phase compensation calculator 98.

The distributor 92 distributes the output of the antenna element 30-1 to the phase shifters 94-*k* (k=1~n). The phase shifter 94-*k* (k=1~n) compensates any phase deviation caused by the difference of the transmission line length from the phase shifter 94-*k* to the receiver 32-*k* to thereby execute an adjustment so that the phase difference between the input signal of the receiver 32-*j* and the input signal of the receiver 32-1 is reduced to a desired value such as zero.

The switch circuit 96-*k* (k=1~n) selectively supplies either the output of the antenna element 30-*k* or the output of the phase shifter 94-*k* to the receiver 32-*k*, and it is controlled by a control signal CNTL outputted from the phase compensation calculator 98.

The phase compensation calculator 98 is a circuit for calculating a required phase compensation amount relative to the output Xj of the receiver 32-*j* (j=2~n). In the present invention, $\Delta\Theta_j$ in the phase difference $[(\phi_j-\phi_1)+\Delta\Theta_j]$ between the output Xj of the receiver 32-*j* and the output X1 of the receiver 32-1 is phase-compensated by the phase shifters 94-1 and 94-*j*, so that $\Delta\Theta_j=0$ for example.

In order to select an input signal to the receiver 32-*k* (k=1~n), a controller included in the phase compensation calculator 98 generates a control signal CNTL in response to a signal, which instructs calculation of a required phase compensation amount, from an unshown exchange or the like in a time zone unused by the user, and then outputs the control signal CNTL to the averager and the switch circuits 90 and 96-*k* (k=1~n).

Figure 18:
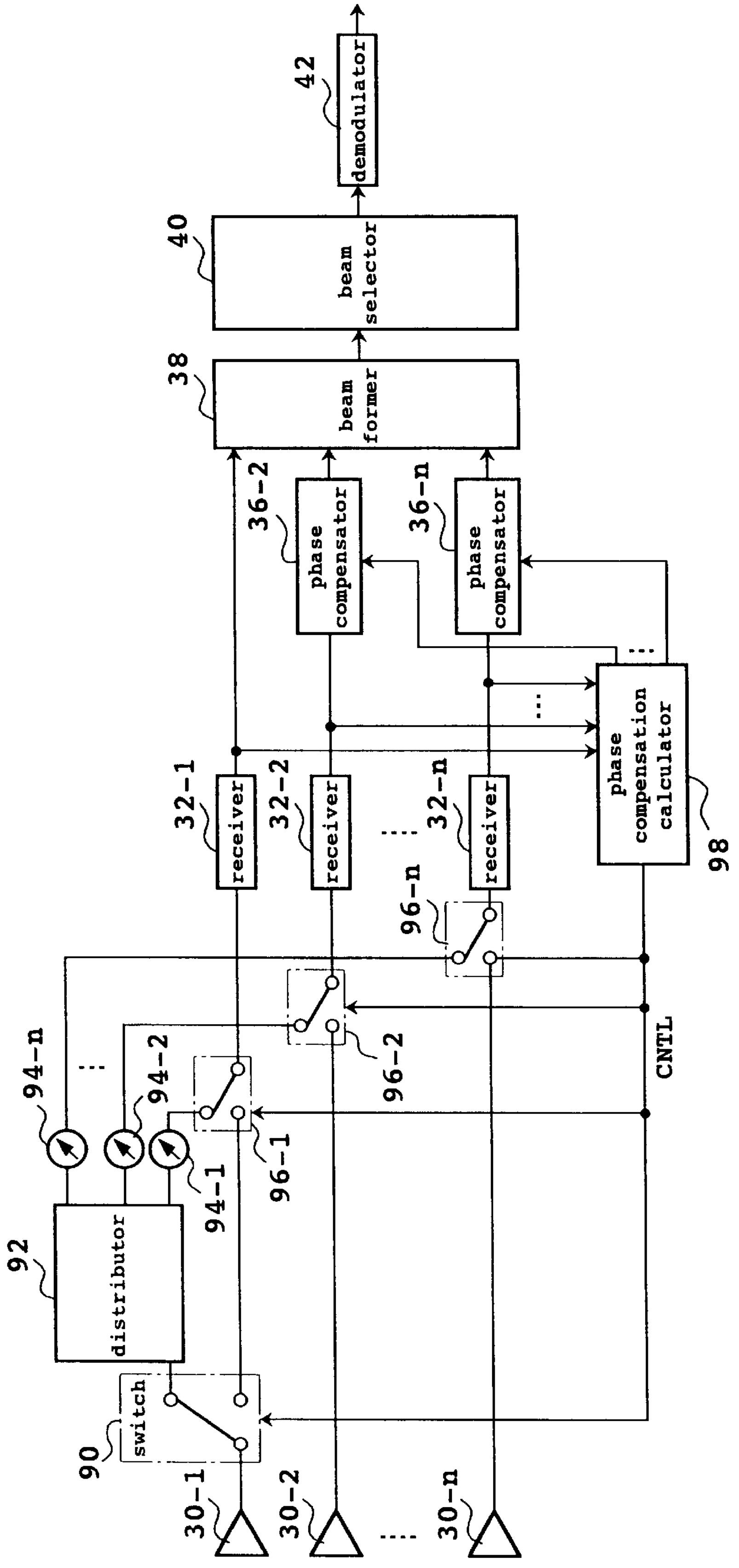
FIG. 18 is an explanatory diagram relative to the operation performed in FIG. 17.

FIG. 18 is an explanatory diagram relative to the operation performed in FIG. 17. Hereinafter the operation of the radio base station in a cellular mobile communication system according to Embodiment 4 will be described with reference to the diagrams mentioned above. For example, an unshown controller in the phase compensation calculator 98 receives a signal, which instructs calculation of a required phase compensation amount, from an unshown exchange or the like managing a plurality of radio base stations, and then outputs a control signal CNTL to the switch circuits 90, 96-*k* (k=1~n) and the averager.

The switch circuit 90 selectively connects the output terminal of the antenna element 30-1 to the input terminal of the distributor 92 in response to the control signal CNTL, as shown in FIG. 18. And the switch circuit 96-*k* (k=1~n) selectively connects the output terminal of the phase shifter 94-*k* to the input terminal of the receiver 32-*k* in response to the control signal CNTL. Meanwhile, in synchronism with the control signal CNTL, an up-signal is transmitted to the radio base station from a transmitter in the mobile station positioned in the sector. Then the antenna element 30-*k* (k=1~n) receives this up-signal and supplies the same to the switch circuits 90 and 96-*k* (k=1~n).

The output of the antenna element 30-1 is supplied via the switch circuit 90 to the distributor 92. Subsequently the distributor 92 distributes the output of the antenna element 30-1 to each of the phase shifters 94-*k* (k=1~n). Each phase shifter 94-*k* corrects the output phase of the distributor 92 by a fixed phase correction amount for adjusting the input phase of the receiver 32-*k* to a desired phase, e.g., for attaining an in-phase relationship to the receiver 32-1, and then supplies the phase-corrected output to the switch circuit 96-*k*.

The switch circuit 96-*k* sends its output to the receiver 32-*k*. Therefore the input signal of the receiver 32-*j* (j=2~n) has an in-phase relationship to the input signal of the receiver 32-1 or has a deviation of the known value $\Delta\Theta_j$ therefrom. The receiver 32-1 receives the output of the switch circuit 96-1 and, after converting it into orthogonal baseband signal, outputs the same to the beam former 38 while outputting a complex conjugate thereof to the phase compensation calculator 98. The receiver 32-*j* (j=2~n) sends its output to the phase compensator 36-*j* and the phase compensation calculator 98.

The phase compensation calculator 98 multiplies, in an unshown multiplier, the complex conjugate X*1 of the output X1 of the receiver 32-1 by the output Xj of the receiver 32-*j*, then subtracts, in an adder, the known phase difference $\Delta\Theta_j$, which has already been adjusted by the phase shifter 94-*j* (j=2~n) to, e.g., zero in the case of having an in-phase relationship to the output of the phase shifter 94-1, from the output phase of the multiplier, and sends the result of such subtraction to an averager. Subsequently the averager calculates an average value in response to a control signal CNTL and then outputs the phase compensation amount $\Delta\phi_j$ to the phase compensator 36-*j*.

After calculation of the phase compensation amount $\Delta\phi_j$, an exchange for example transmits a signal, which instructs a halt of calculating the phase compensation amount, to the phase compensation calculator 98. In response to this signal, the phase compensation calculator 98 controls the switch circuits 90 and 96-*k* (k=1~n) in a manner to connect the output terminal of the antenna element 30-*k* (k=1~n) to the input terminal of the receiver 32-*k*, as shown in FIG. 17.

An up-signal from the user is received by the antenna element 30-*k* (k=1~n) and then is converted into orthogonal baseband signal by the receiver 32-*k* (k=1~n). The output of the receiver 32-*j* (j=2~n) is phase-compensated in accordance with the phase compensation amount $\Delta\phi_j$ calculated already in the phase compensation calculator 98, and then is outputted to the beam former 38.

The beam former 38 is supplied with the output A1 (=X1) of the receiver 32-1 and the phase-compensated output Aj (j=2~n), and executes digital signal processing by a multi-beam antenna or adaptive array antenna system. In the multi-beam antenna where the input phase has already been compensated, the beam forming efficiency is enhanced.

The beam selector 40 selects the highest-level beam of the desired user signal from the plural outputs of the beam former 38 and then outputs the selected beam to the demodulator 42. Subsequently the demodulator 42 demodulates the modulated signal of π/4 shift QPSK or the like. According to Embodiment 4 described above, the same effects are achievable as in Embodiment 1.

Embodiment 5

Figure 19:
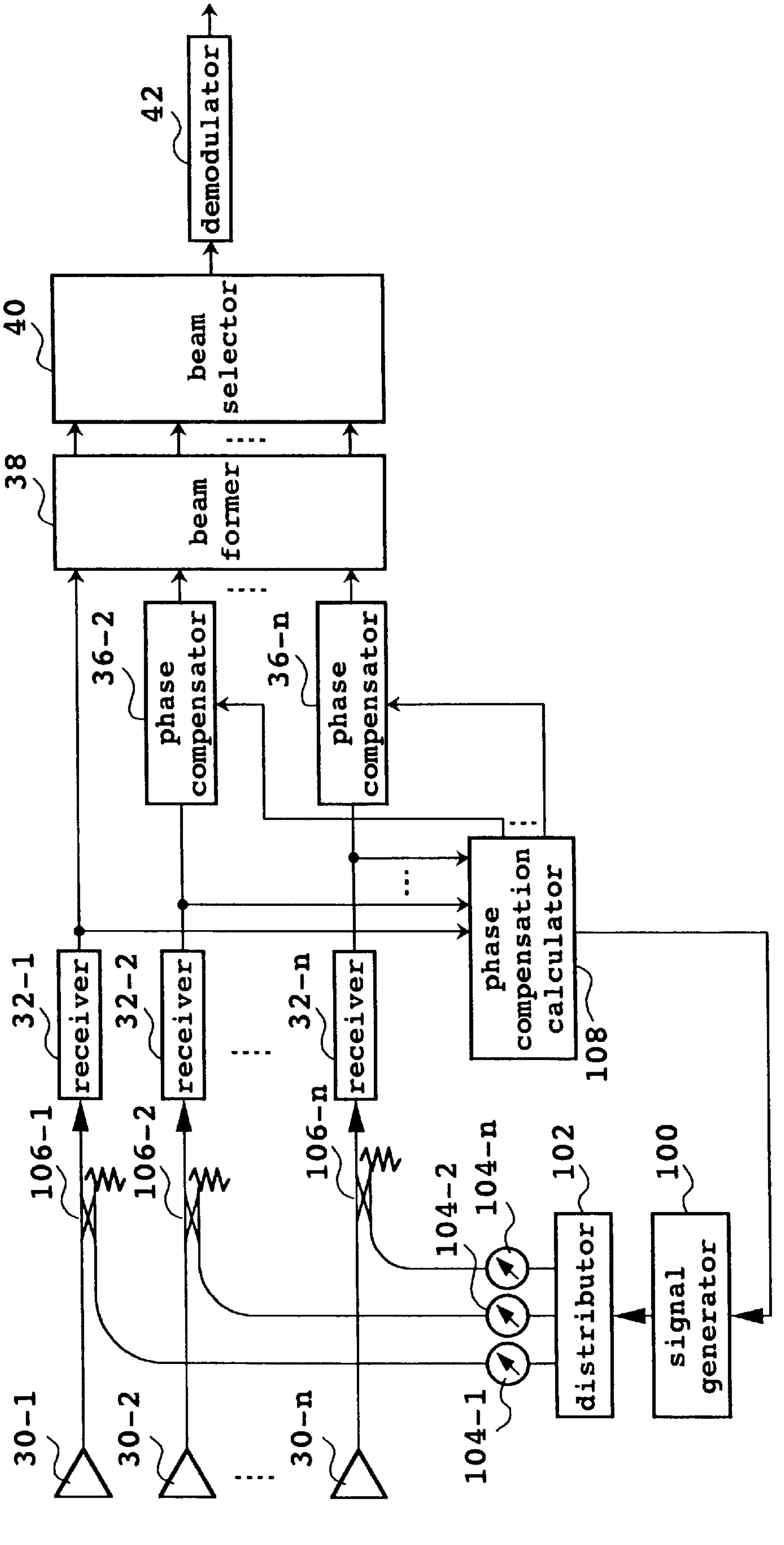
FIG. 19 is a functional block diagram of a radio base station according to Embodiment 5 of the invention.

FIG. 19 is a block diagram of a radio base station according to Embodiment 5 of the present invention, wherein any components corresponding functionally to those shown in FIG. 4 are denoted by like reference numerals.

As shown in this diagram, the radio base station constitutes a TDMA cellular mobile communication system for example and comprises a plurality of antenna elements 30-*k* (k=1~n) directed to a same sector, a signal generator 100, a distributor 102, phase shifters 104-*k* (k=1~n), couplers 106-*k*

(k=1~n), receivers 32-*k* (k=1~n), a phase compensation calculator 108, phase compensators 36-*j* (j=2~n), a beam former 38, a beam selector 40, and a demodulator 42.

All of the antenna elements 30-*k* (k=1~n), receivers 32-*k* (k=1~n), phase compensators 36-*j* (j=2~n), beam former 38, beam selector 40 and demodulator 42 are the same as those shown in FIG. 4. Therefore a repeated explanation thereof is omitted here. The signal generator 100 is a device for generating a high-frequency signal of a radio frequency band for example used in the radio mobile station. And the distributor 102 distributes a high-frequency signal obtained from the signal generator 100 to each of the phase shifters 104-*k* (k=1~n).

Each phase shifter 104-*k* (k=1~n) compensates any phase deviation caused by the difference of the transmission line length from the phase shifter 104-*k* to the receiver 32-*k* (k=1~n) or by the difference of the characteristics of the coupler 106-*k* to thereby execute an adjustment so that the phase difference between the input signal of the receiver 32-*j* (j=2~n) and the input signal of the receiver 32-1 is reduced to a desired value such as zero.

The coupler 106-*k* (k=1~n) couples the output of the antenna element 30-*k* with the output of the phase shifter 104-*k*. And the phase compensation calculator 108 is a circuit for calculating a required phase compensation amount. Hereinafter a description will be given on the operation of the radio base station according to Embodiment 5 shown in FIG. 19. For example in a time zone unused by the user, an unshown controller in the phase compensation calculator 108 receives a signal, which instructs calculation of a required phase compensation amount, from an unshown exchange or the like managing a plurality of radio base stations, and then outputs a control signal to the averager.

The signal generator 100 generates a signal of a predetermined frequency in synchronism with the input control signal and then outputs the same to the distributor 102. Subsequently the distributor 102 receives the output of the signal generator 100 and distributes the same to each of the phase shifters 104-*k* (k=1~n). Each phase shifter 104-*k* corrects the output phase of the distributor 102 by a fixed phase correction amount for adjusting the input phase of the receiver 32-*k* to a desired phase, e.g., for attaining an in-phase relationship to the receiver 32-1, and then supplies the phase-corrected output to the coupler 106-*k*.

The coupler 106-*k* couples the output of the antenna element 30-*k* with the output of the phase shifter 104-*k* and then supplies the coupled output to the receiver 32-*k*. The phase difference $\Delta\Theta_j$ between the input of the receiver 32-*j* (j=2~n) and the input of the receiver 32-1 is adjusted to a desired value, e.g., to zero. The receiver 32-1 receives the output of the coupler 106-1 and, after converting it into orthogonal baseband signal, outputs the same to the beam former 38 while outputting a complex conjugate thereof to the phase compensation calculator 108. The receiver 32-*j* (j=2~n) receives the output of the coupler 106-*j* and sends the orthogonal baseband signal to the phase compensator 36-*j* and the phase compensation calculator 108.

The phase compensation calculator 108 multiplies, in an unshown multiplier, the complex conjugate X*1 of the output X1 of the receiver 32-1 by the output Xj (j=2~n) of the receiver 32-*j*, then subtracts, in an adder, the known phase difference $\Delta\Theta_j$, which has already been adjusted by the phase shifter 104-*j* (j=2~n) to, e.g., zero in the case of having an in-phase relationship to the output of the phase shifter 104-1, from the output phase of the multiplier, and sends the result of such subtraction to an averager. Subsequently the averager calculates an average value in response to a control signal CNTL and then outputs the phase compensation amount $\Delta\phi_j$ to the phase compensator 36-*j*.

After calculation of the phase compensation amount $\Delta\phi_j$, an exchange for example transmits a signal, which instructs a halt of calculating the phase compensation amount, to the phase compensation calculator 108. And in response to this signal, the phase compensation calculator 108 halts generation of the signal of the signal generator 100.

An up-signal from the user is received by the antenna element 30-*k* (k=1~n) and then is outputted to the receiver 32-*k* via the coupler 106-*k*. This signal is converted into orthogonal baseband signal by the receiver 32-*k* (k=1~n). Since the operation of the signal generator 100 is at a halt here, only the user up-signal alone is extracted. The output of the receiver 32-*j* (j=2~n) is phase-compensated in accordance with the phase compensation amount $\Delta\phi_j$ calculated already in the phase compensation calculator 108, and then is outputted to the beam former 38.

The beam former 38 is supplied with the output A1 (=X1) of the receiver 32-1 and the phase-compensated output Aj of the phase compensator 36-*j* (j=2~n), and executes digital signal processing by a multi-beam antenna or adaptive array antenna system. In the multi-beam antenna where the input phase has already been compensated, the beam forming efficiency is enhanced. The beam selector 40 selects the highest-level beam of the desired user signal from the plural outputs of the beam former 38 and then outputs the selected beam to the demodulator 42. Subsequently the demodulator 42 demodulates the modulated signal of π/4 shift QPSK or the like. According to Embodiment 5 described above, the same effects are achievable as in Embodiment 1.

Embodiment 6

Figure 20:
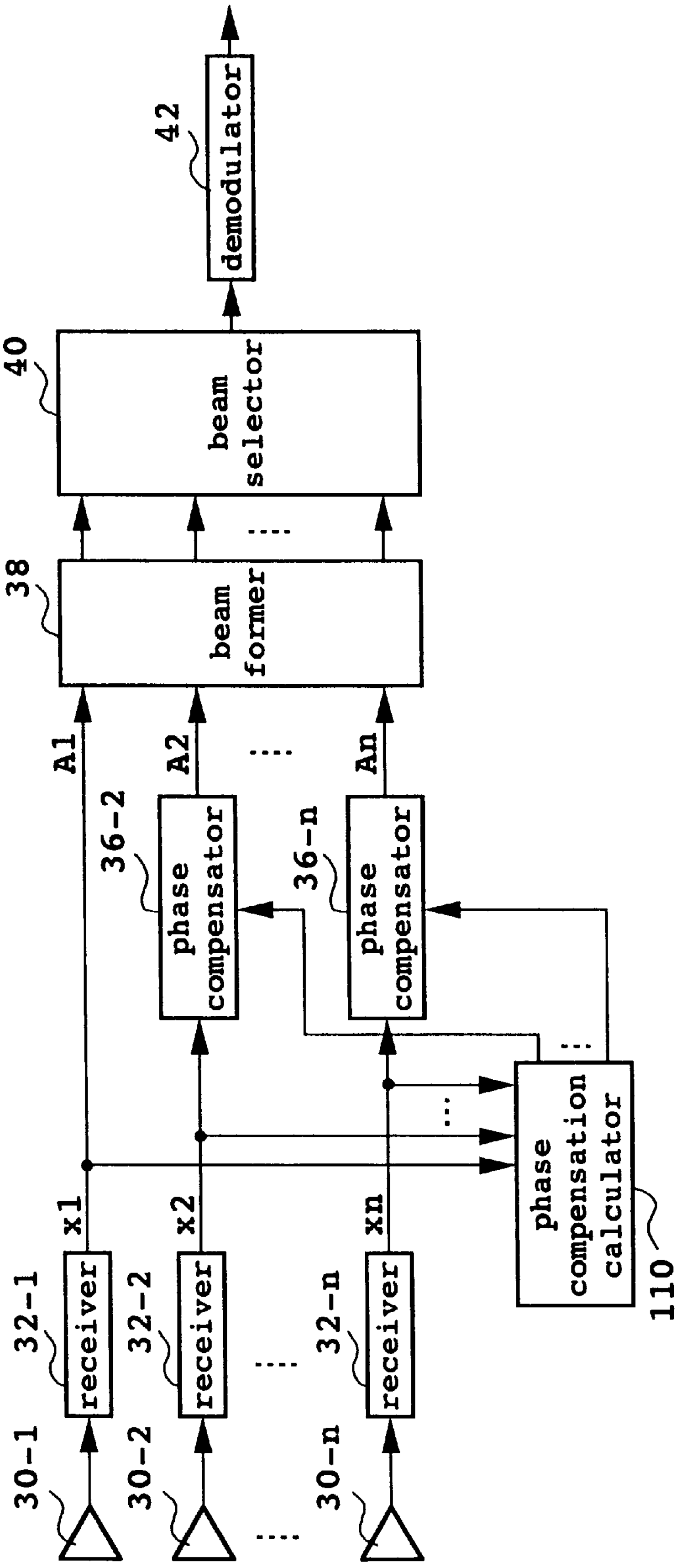
FIG. 20 is a functional block diagram of a radio base station according to Embodiment 6 of the invention.

FIG. 20 is a block diagram of a radio base station according to Embodiment 6 of the present invention, wherein any components corresponding functionally to those shown in FIG. 4 are denoted by like reference numerals. As shown in this diagram, the radio base station constitutes a TDMA cellular mobile communication system for example and comprises a plurality of antenna elements 30-*k* (k=1~n) directed to a same sector, receivers 32-*k* (k=1~n), a phase compensation calculator 110, phase compensators 36-*j* (j=2~n), a beam former 38, a beam selector 40, and a demodulator 42.

Figure 21:
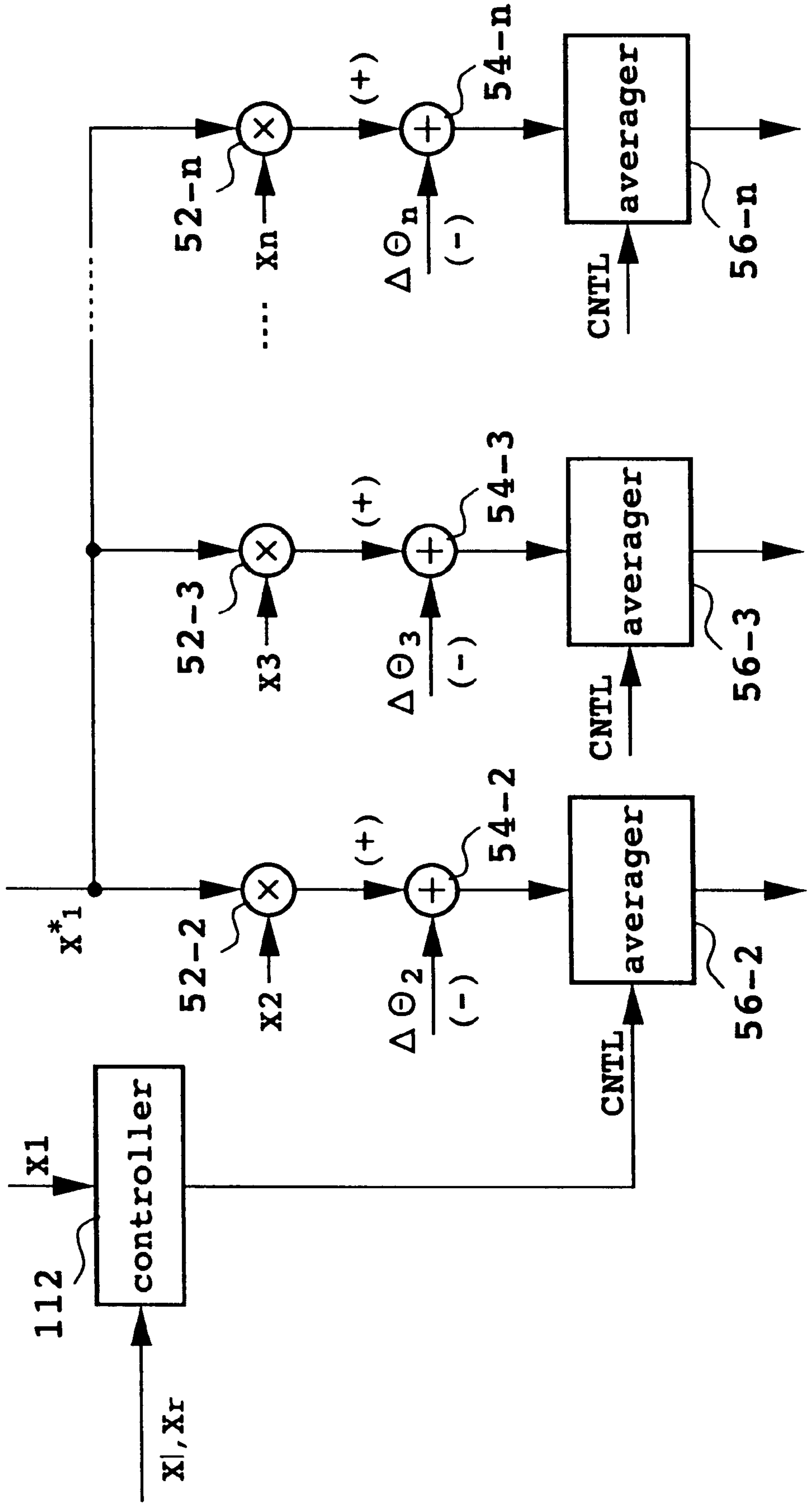
FIG. 21 is a circuit block diagram of a phase compensation calculator included in FIG. 20.

All of the antenna elements 30-*k*, receivers 32-*k* (k=1~n), phase compensators 36-*j* (j=2~n), beam former 38, beam selector 40 and demodulator 42 are the same as those shown in FIG. 4. Therefore a repeated explanation thereof is omitted here. FIG. 21 is a circuit block diagram of the phase compensation calculator included in FIG. 20, wherein any components corresponding functionally to those shown in FIG. 7 are denoted by like reference numerals. The phase compensation calculator 110 is a circuit to calculate a required phase compensation amount for each of the receivers 32-*j* (j=2~n), and it comprises a controller 112, multipliers 52-*j* (j=2~n), adders 54-*j* and averagers 56-*j*.

The controller 112 is supplied with the output X1 of one receiver in the left adjacent sector out of two adjacent sectors constituted as in FIG. 20, also the output Xr of one receiver in the right adjacent sector, and further the output of one receiver out of the entire receivers 32-*k* (k=1~n) in FIG. 20, e.g., the output X1 of the receiver 32-1. The controller 112 activates the control signal CNTL when the power differences $X1-X_1$ and X1−Xr exceed a predetermined threshold value d, or inactivates the control signal CNTL in any other case. As will be described later, the threshold value d defines a range to select an object for calculation of a required phase compensation amount, and it is set in accordance with the radiation pattern of the antenna elements 30-*k* and those in the adjacent sectors, and the range to be defined. All of the multipliers 52-*j* (j=2~n), adders 54-*j* and averagers 56-*j* are the same as those in FIG. 5. Therefore a repeated explanation thereof is omitted here.

Figure 22:
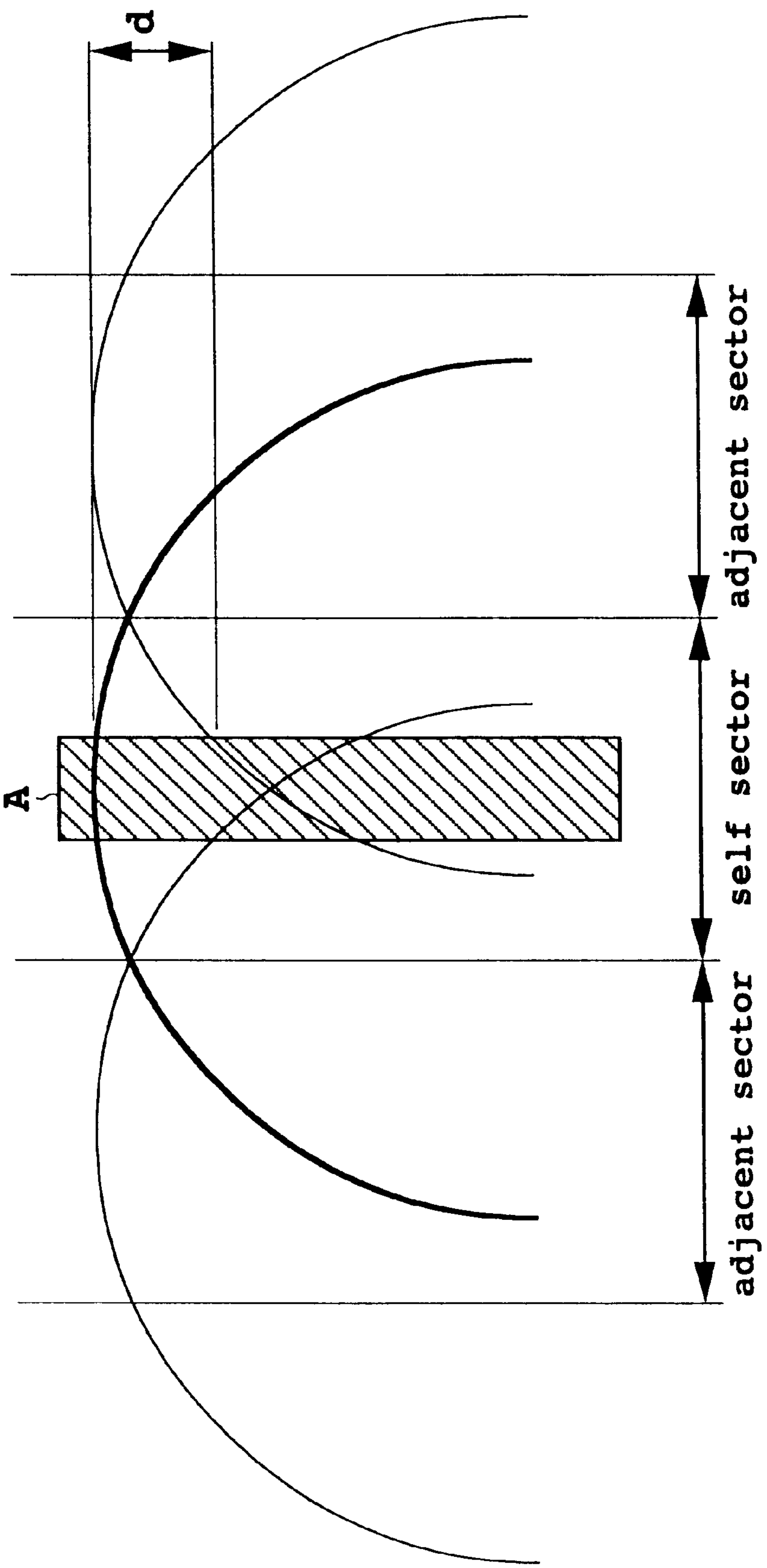
FIG. 22 shows the direction of arrival of user signals to be selected.

FIG. 22 shows how a user is selected. Hereinafter the operation of the radio base station in a cellular mobile communication system according to Embodiment 6 of FIG. 21 will be described with reference to FIG. 22. For example, a user up-signal directed to the sector denoted by oblique lines in FIG. 22 is received by the antenna element 30-*k* (k=1~n), and then the input signal is supplied to the receiver 32-*k*. Subsequently the input signal is converted into orthogonal digital signals in the receiver 32-*k*.

The output X1 of the receiver 32-1 is supplied to the beam former 38 and the controller 112 in the phase compensation calculator 110, and the complex conjugate X*1 of X1 is inputted to the multiplier 52-*j* (j=2~n) in the phase compensation calculator 110. The output Xj of the receiver 32-*j* (j=2~n) is supplied to the multiplier 52-*j* in the phase compensation calculator 110 and the phase compensator 36-*j*.

Meanwhile the receiver output X1 of one antenna element in the left adjacent sector constituted as in FIG. 20 and the receiver output Xr of one antenna element in the right adjacent sector are inputted to the controller 112 in the phase compensation calculator 110. The controller 112 finds the powers of X1, $X_1$ and Xr through detection, and then calculates {(power of X1)−(power of $X_1$) } and {(power of X1)−(power of Xr)}. The controller 112 activates its control signal CNTL when such two differences exceed a predetermined threshold value d, or inactivates the control signal CNTL in another case.

As shown in FIG. 22, the antenna elements in each sector have a fixed radiation pattern, wherein a thick line denotes the radiation pattern in the self sector (receiver 32-1), while a thin line denotes the radiation pattern in the adjacent sector. Therefore an up-signal, in which the differences {(power of X1)−(power of $X_1$)} and {(power of X1)−(power of Xr)} both exceed the threshold value d, is presumed to arrive from the vicinity A of the central direction of the self sector shown in FIG. 22.

The multiplier 52-*j* in FIG. 21 multiplies the complex conjugate X*1 of the output X1 of the receiver 32-1 by the output Xj of the receiver 32-*j* and then supplies the result to the averager 56-*j*. The average position of the vicinity A in FIG. 22 is in the central direction of the self sector. Accordingly, with regard to the up-signal from the user positioned in the vicinity A, the average value of the phase rotation quantity of the antenna element 30-*j* to the antenna element 30-1 is 0.

Consequently the average value $\Delta\Theta_j$ (=0) of the phase rotation quantity is inputted to the (−) terminal of the adder 54-*j*, so that it is not necessary in the adder 54-*j* to subtract the phase rotation quantity from the output of the multiplier 52-*j*, and the result of its multiplication is outputted directly to the averager 56-*j*. Subsequently the averager 56-*j* obtains the output phase of the multiplier 52-*j* in response to the control signal CNTL, then calculates the average value of the phase, and outputs the phase compensation amount to the phase compensator 36-*j*.

The phase compensator 36-*j* executes a phase compensation for the output Xj of the receiver 32-*j* by the amount $\Delta\phi_j$ obtained from the phase compensation calculator 110, and then supplies the phase-compensated output to the beam former 38. The beam former 38 receives the output X1 of the receiver 32-1 and the phase-compensated output Aj of the phase compensator 36-*j* (j=2~n), and executes digital signal processing by a multi-beam antenna or adaptive array antenna system. In the multi-beam antenna where the input phase has already been compensated, the beam forming efficiency is enhanced.

The beam selector 40 selects the highest-level beam of the desired user signal from the plural outputs of the beam former 38 and then outputs the selected beam to the demodulator 42. Subsequently the demodulator 42 demodulates the modulated signal of $\pi/4$ shift QPSK or the like. According to Embodiment 6 described above, the same effects are achievable as in Embodiment 1.

It is to be understood that the present invention is not limited to the above embodiments alone and may be modified in various manners. For example, the following modifications are achievable.

(a) In Embodiments 1 and 2, there is selected a user signal being under inter-sector handover or inter-cell handover. However, any user not being under such handover may also be selected. In this case, the average arrival angle of the user signal is 0°.

(b) Each of the embodiments has been explained above with regard to a radio base station in a TDMA cellular mobile communication system. However, also in CDMA where a plurality of user signals are code-multiplexed simultaneously at one frequency, such signals can be separated into individual user signals as in Eq. (1) through correlated operations in a searcher. Therefore, a modification may be so devised that the user signal separated in the searcher is inputted to a phase compensation calculator where a required phase compensation amount is calculated, then a desired phase compensation is executed in a phase compensator by the calculated amount, and the phase-compensated signal is outputted to a beam former.

(c) Although each of the above embodiments relates to an exemplary case of a linear array antenna, the same result can be attained in some other antenna by replacing $\Delta\theta_i$, . . . , $(n-1)\Delta\theta_i$ in the aforementioned equation with $\cdot\Delta\theta_{i2}$, . . . , $\Delta\theta_{in}$ which are given in Eq. (15) below.

$$\Delta\theta in=(X_n \cos\psi_i+y_n \sin\psi_i)\sin\theta_i+Z_n\cos\theta_i \tag{15}$$

where $(x_n, y_n, z_n)$ are coordinates of antenna element.

(d) Although Embodiment 6 is so constituted that the output of the receiver 32-1 is supplied to the controller 112, an intermediate frequency (IF) signal, which is an input to an AGC circuit included in the receiver 32-1, may be supplied to the controller 112.

According to the present invention, as described hereinabove, the phase difference between the output of the first receiver and that of the second receiver is calculated by the phase compensation calculator, and then the output phase of the second receiver is corrected by the phase compensator, so that the phase-compensated user signal is supplied to the beam former to consequently enhance the beam forming efficiency thereof in the case of a multi-beam antenna system.

Meanwhile in the case of an adaptive antenna system, it is possible in the beam former to execute separation of phase deviation, adaptive processing amplitude and phase controlled variable, so that in a transmission mode, transmission beam forming can be carried out on the basis of the adaptive processing amplitude and phase controlled variable obtained in a reception mode.

What is claimed is:

1. A radio base station in a cellular mobile communication system comprising:

a plurality of antenna elements having directivity to respective divided sectors of a cell which is a range predetermined for transmission and reception of signals between the base station and each of mobile stations;

a plurality of receivers provided correspondingly to said antenna elements for extracting a desired frequency component from a signal received by said antenna elements directed to a same sector and then frequency-converting the extracted component to a predetermined band;

a beam former for forming a desired beam pattern on the basis of the output signals of said receivers directed to each sector, wherein one reference antenna element out of the plurality of antenna elements directed to the same sector is set as a first antenna element, one receiver for frequency-converting the signal received by said first antenna element is set as a first receiver, any antenna element different from said first antenna element is set as a second antenna element, and the receiver for frequency-converting the signal received by said second antenna element is set as a second receiver;

phase compensation calculating means for calculating, in response to the outputs of the first and second receivers relative to a specific up-signal, a required phase compensation amount which represents the difference phase amount between the output-signal phase difference of said first and second receivers and the input-signal phase difference of said first and second receivers; and phase compensating means for correcting the phase of the output signal of said second receiver on the basis of the phase compensation amount.

2. The radio base station in a cellular mobile communication system according to claim 1, wherein said phase compensation calculating means comprises:

control means for producing a control signal to signify that output of said first and second receivers are based on an up-signal which, out of up-signals from the mobile stations positioned in the sector to which said first and second antenna elements are directed, belongs to a population where the phase-rotation average value indicative of the phase difference between the output signal of said first antenna element and that of said second antenna element is a known value; and averaging means for calculating, in response to said control signal, a required phase compensation amount which represents the difference between said known value and the average value of the phase difference between the output signal of said first receiver and that of said second receiver.

3. The radio base station in a cellular mobile communication system according to claim 2, wherein said control means produces a control signal to signify that the output signals are based on an up-signal under inter-sector handover to a mobile station positioned in the vicinity of the border between one sector, to which said first and second antenna elements are directed, and a specific sector adjacent thereto; and said averaging means adopts, as said known values, those obtained previously on the basis of the average position of the relevant mobile station under the inter-sector handover and the positions of said first and second antenna elements.

4. The radio base station in a cellular mobile communication system according to claim 2, wherein said control means produces a control signal to signify that the output signals are based on an up-signal under inter-cell handover to a mobile station positioned within a fixed range from a specific center which is spaced apart by a fixed distance from the radio base station; and said averaging means adopts, as said known values, those obtained previously on the basis of the position of said specific center and the positions of said first and second antenna elements.

5. The radio base station in a cellular mobile communication system according to claim 2, wherein said control means produces a control signal to signify that said output signals are based on an up-signal where the level difference between the output signal of any third antenna element directed to a specific sector adjacent to the first sector to which said first and second antenna elements are directed, and the output signal of any fourth antenna element directed to said first sector, is below a predetermined threshold value; and said averaging means adopts, as said known values, those obtained previously on the basis of the average position of the mobile station where said level difference is below the threshold value, the positions of said first and second antenna elements, and the radiation patterns of said third and fourth antenna elements.

6. The radio base station in a cellular mobile communication system according to claim 2, wherein said control means produces a control signal to signify that said output signals are based on an up-signal where the level differences between the output signals of any third and fourth antenna elements directed respectively to two sectors adjacent to the first sector to which said first and second antenna elements are directed, and the output signal of any fifth antenna element directed to said first sector, are both above a predetermined threshold value; and said averaging means adopts, as said known values, those obtained previously on the basis of the average position of the mobile station where said level differences are both above the threshold value, the positions of said first and second antenna elements, and the radiation patterns of said third, fourth and fifth antenna elements.

7. The radio base station in a cellular mobile communication system according to claim 1, further comprising a signal generator to send a signal from a known position within the sector to which said first and second antenna elements are directed, wherein said phase compensation calculating means calculates said phase compensation amount or said first phase compensation amount by using the output signals of said first and second receivers relative to the signal from said signal generator, on the basis of the phase difference between the output signals of said first and second antenna elements obtained from the known position of said signal generator and the positions of said first and second antenna elements.

8. The radio base station in a cellular mobile communication system according to claim 1, further comprising:

a signal generator for producing a signal of the same band as the radio band used in the cellular mobile communication system and then outputting said signal to a signal line;

first output means for outputting to said first receiver a first signal based on the signal obtained from said signal line; and second output means for outputting to said second receiver a second signal based on the signal obtained from said signal line;

wherein said phase compensation calculating means calculates said phase compensation amount or said first phase compensation amount by using the output signal of the first receiver relative to said first signal and the output signal of the second receiver relative to said second signal, on the basis of the known phase difference between said first and second signals.

9. The radio base station in a cellular mobile communication system according to claim 8, wherein said first output means consists of a first coupler for coupling said first signal and the output signal of said first antenna element, and said second output means consists of a second coupler for coupling said second signal and the output signal of said second antenna element; said radio base station further comprising:

a phase shifter for shifting the phase of the signal obtained from said signal line, in such a manner that the phase difference between the input signal of the first receiver relative to said first signal and the input signal of the second receiver relative to said second signal becomes a desired known value.

10. The radio base station in a cellular mobile communication system according to claim 1, further comprising switch means for delivering to said second receiver a first signal based on the output signal of the first antenna element, wherein said phase compensation calculating means calculates said phase compensation amount or said first phase compensation amount by using the output signal of the first receiver and the output signal of the second receiver relative to said first signal, on the basis of the known phase difference between the output signal of said first antenna element and said first signal.

11. The radio base station in a cellular mobile communication system according to claim 10, further comprising a phase shifter for shifting the phase of the output signal obtained from said first antenna element, in such a manner that the phase difference between the input signal of the first receiver relative to the output signal of said first antenna element and the input signal of the second receiver relative to said first signal becomes a desired known value.

12. A radio base station in a cellular mobile communication system comprising:

a plurality of antenna elements having directivity to respective divided sectors of a cell which is a range predetermined for transmission and reception of signals between the base station and each of mobile stations;

a plurality of receivers provided correspondingly to said antenna elements for extracting a desired frequency component from a signal received by said antenna elements directed to a same sector and then frequency-converting the extracted component to a predetermined band;

a beam former for forming a desired beam pattern on the basis of the output signals of said receivers directed to each sector, wherein one reference antenna element out of the plurality of antenna elements directed to the same sector is set as a first antenna element, one receiver for frequency-converting the signal received by said first antenna element is set as a first receiver, any antenna element different from said first antenna element is set as a second antenna element, and the receiver for frequency-converting the signal received by said second antenna element is set as a second receiver;

phase compensating means for correcting the phase of the output signal of said second receiver on the basis of a first phase compensation amount;

phase compensation calculating means for calculating a second phase compensation amount which represents the difference phase amount between the output-signal phase difference of said first receiver and said phase compensating means and the input-signal phase difference of said first and second receivers; and adding means for adding the output signal thereof to said second phase compensation amount, and outputting said first phase compensation amount to said phase compensating means.

13. The radio base station in a cellular mobile communication system according to claim 12, wherein said phase compensation calculating means comprises:

control means for producing a control signal to signify that the outputs of said first receiver and said phase compensating means are based on an up-signal which, out of up-signals from the mobile stations positioned in the sector to which said first and second antenna elements are directed, belongs to a population where the phase-rotation average value indicative of the phase difference between the output signal of said first antenna element and that of said second antenna element is a known value; and averaging means for calculating, in response to said control signal, the required phase compensation amount which represents the difference between said known value and the average value of the phase difference between the output signal of said first receiver and that of said phase compensating means.

14. The radio base station in a cellular mobile communication system according to claim 13, wherein said control means produces a control signal to signify that the output signals are based on an up-signal under inter-sector handover to a mobile station positioned in the vicinity of the border between one sector, to which said first and second antenna elements are directed, and a specific sector adjacent thereto; and said averaging means adopts, as said known values, those obtained previously on the basis of the average position of the relevant mobile station under the inter-sector handover and the positions of said first and second antenna elements.

15. The radio base station in a cellular mobile communication system according to claim 13, wherein said control means produces a control signal to signify that the output signals are based on an up-signal under inter-cell handover to a mobile station positioned within a fixed range from a specific center which is spaced apart by a fixed distance from the radio base station; and said averaging means adopts, as said known values, those obtained previously on the basis of the position of said specific center and the positions of said first and second antenna elements.

16. The radio base station in a cellular mobile communication system according to claim 13, wherein said control means produces a control signal to signify that said output signals are based on an up-signal where the level difference between the output signal of any third antenna element directed to a specific sector adjacent to the first sector to which said first and second antenna elements are directed, and the output signal of any fourth antenna element directed to said first sector, is below a predetermined threshold value; and said averaging means adopts, as said known values, those obtained previously on the basis of the average position of the mobile station where said level difference is below the threshold value, the positions of said first and second antenna elements, and the radiation patterns of said third and fourth antenna elements.

17. The radio base station in a cellular mobile communication system according to claim 13, wherein said control means produces a control signal to signify that said output signals are based on an up-signal where the level differences between the output signals of any third and fourth antenna elements directed respectively to two sectors adjacent to the first sector to which said first and second antenna elements are directed, and the output signal of any fifth antenna element directed to said first sector, are both above a predetermined threshold value; and said averaging means adopts, as said known values, those obtained previously on the basis of the average position of the mobile station where said level differences are both above the threshold value, the positions of said first and second antenna elements, and the radiation patterns of said third, fourth and fifth antenna elements.

18. The radio base station in a cellular mobile communication system according to claim 12, further comprising a signal generator to send a signal from a known position within the sector to which said first and second antenna elements are directed, wherein said phase compensation calculating means calculates said phase compensation amount or said first phase compensation amount by using the output signals of said first and second receivers relative to the signal from said signal generator, on the basis of the phase difference between the output signals of said first and second antenna elements obtained from the known position of said signal generator and the positions of said first and second antenna elements.

19. The radio base station in a cellular mobile communication system according to claim 12, further comprising:

a signal generator for producing a signal of the same band as the radio band used in the cellular mobile communication system and then outputting said signal to a signal line;

first output means for outputting to said first receiver a first signal based on the signal obtained from said signal line; and second output means for outputting to said second receiver a second signal based on the signal obtained from said signal line;

wherein said phase compensation calculating means calculates said phase compensation amount or said first phase compensation amount by using the output signal of the first receiver relative to said first signal and the output signal of the second receiver relative to said second signal, on the basis of the known phase difference between said first and second signals.

20. The radio base station in a cellular mobile communication system according to claim 19, wherein said first output means consists of a first coupler for coupling said first signal and the output signal of said first antenna element, and said second output means consists of a second coupler for coupling said second signal and the output signal of said second antenna element; said radio base station further comprising:

a phase shifter for shifting the phase of the signal obtained from said signal line, in such a manner that the phase difference between the input signal of the first receiver relative to said first signal and the input signal of the second receiver relative to said second signal becomes a desired known value.

21. The radio base station in a cellular mobile communication system according to claim 12, further comprising switch means for delivering to said second receiver a first signal based on the output signal of the first antenna element, wherein said phase compensation calculating means calculates said phase compensation amount or said first phase compensation amount by using the output signal of the first receiver and the output signal of the second receiver relative to said first signal, on the basis of the known phase difference between the output signal of said first antenna element and said first signal.

22. The radio base station in a cellular mobile communication system according to claim 21, further comprising a phase shifter for shifting the phase of the output signal obtained from said first antenna element, in such a manner that the phase difference between the input signal of the first receiver relative to the output signal of said first antenna element and the input signal of the second receiver relative to said first signal becomes a desired known value.

* * * * *